(12) United States Patent
Zhang et al.

(10) Patent No.: US 10,805,804 B2
(45) Date of Patent: Oct. 13, 2020

(54) NETWORK CONTROL METHOD, APPARATUS, AND SYSTEM, AND STORAGE MEDIUM

(71) Applicant: HUAWEI TECHNOLOGIES CO., LTD., Shenzhen (CN)

(72) Inventors: Fan Zhang, Shenzhen (CN); Yi Chao Chen, Shenzhen (CN); Gong Zhang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/420,199

(22) Filed: May 23, 2019

(65) Prior Publication Data

US 2019/0281466 A1 Sep. 12, 2019

Related U.S. Application Data

(63) Continuation of application No. PCT/CN2017/111928, filed on Nov. 20, 2017.

(30) Foreign Application Priority Data

Nov. 23, 2016 (CN) .......................... 2016 1 1046876

(51) Int. Cl.
H04W 16/10 (2009.01)
H04L 12/715 (2013.01)
(Continued)

(52) U.S. Cl.
CPC ......... H04W 16/10 (2013.01); H04L 41/0896 (2013.01); H04L 41/12 (2013.01);
(Continued)

(58) Field of Classification Search
None
See application file for complete search history.

(56) References Cited

U.S. PATENT DOCUMENTS

2004/0105393 A1   6/2004  Ronneke et al.
2015/0063112 A1*  3/2015  Wu et al. ............... H04L 45/64
                                                          370/235

(Continued)

FOREIGN PATENT DOCUMENTS

CN   102076025 A    5/2011
CN   102739507 A   10/2012

(Continued)

OTHER PUBLICATIONS

Wenfeng Xia et al. A Survey on Software-Defined Networking, IEEE Communications Surveys and Tutorials ( vol. 17 , Issue: 1 , Firstquarter 2015 ), pp. 27-51. XP11576284.

(Continued)

Primary Examiner — Brian S Roberts
(74) Attorney, Agent, or Firm — Kilpatrick Townsend & Stockton LLP

(57) ABSTRACT

This application discloses a network control method. The method includes: obtaining global network information; determining resource information of at least one sliced network based on the global network information, where each sliced network is corresponding to one second controller, and resource information of each sliced network includes initial link bandwidth allocated to each aggregation flow in each sliced network on each link in each sliced network; and sending resource information of a corresponding sliced network to each second controller, so that a target second controller performs, through closed-loop control based on a queue status corresponding to a target sliced network, closed-loop correction on initial link bandwidth allocated to each aggregation flow in the target sliced network on each link in the target sliced network, and each switch in the target sliced network transmits a corresponding (Continued)

aggregation flow based on corresponding corrected link bandwidth.

10 Claims, 9 Drawing Sheets

(51) Int. Cl.
    *H04L 12/851*    (2013.01)
    *H04L 12/891*    (2013.01)
    *H04L 12/873*    (2013.01)
    *H04L 12/911*    (2013.01)
    *H04W 16/04*    (2009.01)
    *H04W 28/08*    (2009.01)
    *H04W 28/20*    (2009.01)
    *H04L 12/24*    (2006.01)
    *H04L 12/26*    (2006.01)

(52) U.S. Cl.
    CPC ...... *H04L 41/5025* (2013.01); *H04L 41/5054* (2013.01); *H04L 43/0882* (2013.01); *H04L 45/64* (2013.01); *H04L 47/2483* (2013.01); *H04L 47/41* (2013.01); *H04L 47/52* (2013.01); *H04L 47/783* (2013.01); *H04W 16/04* (2013.01); *H04W 28/085* (2013.01); *H04W 28/20* (2013.01); *H04L 41/5077* (2013.01)

(56) References Cited

U.S. PATENT DOCUMENTS

| | | | |
|---|---|---|---|
| 2015/0154258 A1* | 6/2015 | Xiong | G06F 16/24542 707/718 |
| 2015/0188837 A1 | 7/2015 | Djukic et al. | |
| 2016/0254984 A1* | 9/2016 | Tekalp | H04L 45/02 709/242 |
| 2016/0352528 A1* | 12/2016 | Law | H04L 12/12 |
| 2016/0353465 A1* | 12/2016 | Vrzic | H04W 28/0247 |
| 2019/0007899 A1* | 1/2019 | Vrzic | H04W 16/10 |
| 2019/0238454 A1* | 8/2019 | Celozzi | H04L 45/306 |

FOREIGN PATENT DOCUMENTS

| | | |
|---|---|---|
| CN | 104994033 A | 10/2015 |
| CN | 105376297 A | 3/2016 |
| CN | 106059942 A | 10/2016 |
| CN | 106059960 A | 10/2016 |

OTHER PUBLICATIONS

Daniel F. Macedo et al. Programmable Networks—From Software-Defined Radio to Software-Defined Networking, IEEE Communication Surveys and Tutorials, vol. 17, No. 2, Second Quarter 2015, pp. 1102-1125.

Lei Liu et al. SDN orchestration for dynamic end-to-end control of data center multi-domain optical networking, China Communications ( vol. 12, Issue: 8 , Aug. 2015 ), pp. 10-21. XP11667556.

* cited by examiner

CONT.
FROM
FIG. 4A

CONT.
FROM
FIG. 4A

406. Perform, through closed-loop control based on the queue status corresponding to the target sliced network, closed-loop correction on initial link bandwidth allocated to each aggregation flow in the target sliced network on each link in the target sliced network, to obtain corrected link bandwidth corresponding to the target sliced network, where the corrected link bandwidth corresponding to the target sliced network includes corrected link bandwidth allocated to each aggregation flow in the target sliced network on each link in the target sliced network 407. Deliver corresponding corrected link bandwidth to each switch in the target sliced network, where each switch is configured to transmit a corresponding aggregation flow based on corresponding corrected link bandwidth

FIG. 4B

NETWORK CONTROL METHOD, APPARATUS, AND SYSTEM, AND STORAGE MEDIUM

CROSS-REFERENCE TO RELATED APPLICATIONS

This application is a continuation of International Application No. PCT/CN2017/111928, filed on Nov. 20, 2017, which claims priority to Chinese Patent Application No. 201611046876.5, filed on Nov. 23, 2016, The disclosures of the aforementioned applications are hereby incorporated by reference in their entireties.

TECHNICAL FIELD

This application relates to the field of network technologies, and in particular, to a network control method, apparatus, and system, and a storage medium.

BACKGROUND

As network technologies rapidly develop, more services (such as a voice service, a video service, and an online gaming service) are carried over a network. This leads to a large quantity of data streams with different properties in the network. However, network resources are limited. The limited network resources can be properly allocated to the large quantity of data streams by controlling the network. This can not only maximize network resource utilization, but also optimize service performance indicators.

Software-defined networking (SDN) is a network architecture that separates a data plane from a control plane, and can flexibly control network traffic. Therefore, the SDN is usually used to control a network in a related technology. The SDN includes an SDN controller and a plurality of switches. The SDN controller may collect global network information, calculate a network resource allocation rule based on the global network information, and then distribute a corresponding resource decision to each switch according to the network resource allocation rule. Each switch performs a decision action based on the corresponding resource decision. The global network information is, for example, a status of a data stream in a network. The network resource allocation rule is, for example, a link bandwidth rule (bandwidth occupied by a data stream on a link) or a link transmission rate rule. Each switch may transmit data based on a link transmission rate distributed by the controller.

In a process of implementing this application, the inventor finds that the related technology has at least the following problem:

In a process of using the SDN to control the network, the SDN controller needs to collect the global network information, calculate the network resource allocation rule, and distribute a resource decision to each switch. A delay exists in the process, and a relatively large network scale leads to a relatively high delay. The delay may affect network performance. Therefore, a network control effect is relatively poor.

SUMMARY

To resolve a problem of a relatively poor network control effect, embodiments of this application provide a network control method, apparatus, and system, and a storage medium. The technical solutions are as follows:

According to a first aspect, a network control method is provided, where the method is applied to a first controller in a communications network, the communications network includes the first controller, at least one second controller, and at least one switch, and the method includes:

obtaining global network information, where the global network information includes a capacity of each link in the communications network and traffic matrix information of each aggregation flow in the communications network, and each aggregation flow in the communications network is obtained by classifying all traffic flows in the communications network;

determining resource information of at least one sliced network based on the global network information, where the at least one sliced network is obtained by slicing the communications network, each sliced network in the at least one sliced network is corresponding to one second controller, and resource information of each sliced network includes initial link bandwidth allocated to each aggregation flow in each sliced network on each link in each sliced network; and sending resource information of a corresponding sliced network to each second controller.

According to the solution provided in this embodiment of this application, the first controller slices the communications network to obtain a sliced network, where each sliced network is corresponding to one second controller; and sends the resource information of the corresponding sliced network to each second controller, so that each second controller performs, through closed-loop control based on a queue status of the corresponding sliced network, closed-loop correction on initial link bandwidth allocated to each aggregation flow in the resource information of the corresponding sliced network on each link in the corresponding sliced network, and each switch in the corresponding sliced network transmits an aggregation flow based on corrected link bandwidth. Therefore, the first controller and the second controller can cooperatively control the communications network, thereby reducing a delay and improving a network control effect.

Optionally, the method further includes:

determining, based on the global network information, a routing policy corresponding to the at least one sliced network, where a routing policy corresponding to each sliced network includes a routing policy corresponding to each aggregation flow in each sliced network; and sending a corresponding routing policy to each second controller.

According to the solution provided in this embodiment of this application, the first controller may implement overall control on the network by determining the routing policy corresponding to the at least one sliced network and sending the corresponding routing policy to each second controller.

Optionally, the global network information further includes a network topology structure of the communications network. The network topology structure is used to indicate a connection relationship between the at least one switch.

Optionally, the capacity of each link in the communications network is $\{c_{(u,v)}, \forall(u,v)\}$, where u indicates a source node of a link (u,v), v indicates a destination node of the link (u,v), $c_{(u,v)}$ indicates a capacity of the link (u,v), and $\forall(u,v)$ indicates any link (u,v) in the communications network.

The traffic matrix information of each aggregation flow in the communications network is $\{V^n, \forall n\}$, where $V^n$ indicates a bandwidth requirement of an aggregation flow n, and $\forall n$ indicates any aggregation flow n in the communications network.

The determining resource information of at least one sliced network based on the global network information includes:

determining the resource information of the at least one sliced network based on the capacity of each link in the communications network and the traffic matrix information of each aggregation flow in the communications network when a target function uses a minimum value.

The target function is $$y = \max_{(u,v)} \sum_n \frac{f_{(u,v)}^{n^*}}{c_{(u,v)}},$$

and the target function meets a first constraint, a second constraint, a third constraint, a fourth constraint, and a fifth constraint.

The first constraint is $$\sum_w f_{(w,d)}^{n^*} = V^n, \text{ and } \forall d$$

is a destination node of the aggregation flow n.

The second constraint is $$\sum_w f_{(s,w)}^{n^*} = V^n, \text{ and } \forall s$$

is a source node of the aggregation flow n.

The third constraint is $$\sum_u f_{(u,v)}^{n^*} = \sum_{u'} f_{(v,u')}^{n^*}, \forall v,$$

n.

The fourth constraint is $$\sum_n f_{(u,v)}^{n^*} \leq c_{(u,v)}, \forall (u, v).$$

The fifth constraint is $f_{(u,v)}^{n^*} \geq 0, \forall (u,v), n$.

$f_{(u,v)}^{n^*}$ indicates initial link bandwidth allocated to any aggregation flow n in the communications network on any link (u,v) in the communications network, $f_{(u,v)}^{n^*}/c_{(u,v)}$ indicates initial usage of any aggregation flow n in the communications network on any link (u,v) in the communications network, $$\sum_n \frac{f_{(u,v)}^{n^*}}{c_{(u,v)}}$$

indicates a sum of initial usage of all aggregation flows n in the communications network on any link (u,v) in the communications network, $$\max_{(u,v)} \sum_n \frac{f_{(u,v)}^{n^*}}{c_{(u,v)}}$$

indicates a maximum value in sums of initial usage of all aggregation flows n in the communications network on each link (u,v) in the communications network, $$\sum_w f_{(w,d)}^{n^*}$$

indicates a sum of initial link bandwidth occupied by any aggregation flow n in the communications network on all links (w,d) that use a node d as a destination node in the communications network, $$\sum_w f_{(s,w)}^{n^*}$$

indicates a sum of initial link bandwidth occupied by any aggregation flow n in the communications network on all links (s,w) that use a node s as a source node in the communications network, $$\sum_u f_{(u,v)}^{n^*}$$

indicates a sum of initial link bandwidth occupied by any aggregation flow n in the communications network on all upstream links of a node v in the communications network, $$\sum_{u'} f_{(v,u')}^{n^*}$$

indicates a sum of initial link bandwidth occupied by any aggregation flow n in the communications network on all downstream links of the node v in the communications network, and $$\sum_n f_{(u,v)}^{n^*}$$

indicates a sum of initial link bandwidth allocated to all aggregation flows n in the communications network on any link (u,v) in the communications network.

According to a second aspect, a network control method is provided, where the method is applied to a target second controller in a communications network, the communications network includes a first controller, at least one second controller, and at least one switch, the at least one second controller includes the target second controller, and the method includes:

receiving resource information of a target sliced network sent by the first controller, where the resource information of the target sliced network includes initial link bandwidth allocated to each aggregation flow in the target sliced network on each link in each sliced network, and the target sliced network is corresponding to the target second controller;

obtaining a queue status corresponding to the target sliced network, where the queue status corresponding to the target sliced network includes a queue status corresponding to each switch in the target sliced network, and each switch is corresponding to one queue;

performing, through closed-loop control based on the queue status corresponding to the target sliced network, closed-loop correction on initial link bandwidth allocated to each aggregation flow in the target sliced network on each link in the target sliced network, to obtain corrected link bandwidth corresponding to the target sliced network, where the corrected link bandwidth corresponding to the target sliced network includes corrected link bandwidth allocated to each aggregation flow in the target sliced network on each link in the target sliced network; and delivering corresponding corrected link bandwidth to each switch in the target sliced network, where each switch is configured to transmit a corresponding aggregation flow based on the corresponding corrected link bandwidth.

According to the solution provided in this embodiment of this application, the first controller slices the communications network to obtain a sliced network, and each sliced network is corresponding to one second controller. The target second controller performs, based on the queue status of the target sliced network, closed-loop correction on the initial link bandwidth allocated to each aggregation flow in the target sliced network on each link in the target sliced network, so that each switch in the target sliced network transmits an aggregation flow based on the corrected link bandwidth. Therefore, the first controller and the second controller can cooperatively control the communications network, thereby reducing a delay and improving a network control effect.

Optionally, the corrected link bandwidth corresponding to the target sliced network varies at different moments.

The performing, through closed-loop control based on the queue status corresponding to the target sliced network, closed-loop correction on initial link bandwidth allocated to each aggregation flow in the target sliced network on each link in the target sliced network to obtain corrected link bandwidth corresponding to the target sliced network includes:

predicting a network status of the target sliced network based on the queue status corresponding to the target sliced network, to obtain a predicted network status;

calculating, based on the predicted network status, a link bandwidth correction value corresponding to each aggregation flow in the target sliced network on each link in the target sliced network at a target moment; and performing, based on the link bandwidth correction value corresponding to each aggregation flow in the target sliced network on each link in the target sliced network at the target moment, closed-loop correction on the initial link bandwidth allocated to each aggregation flow in the target sliced network on each link in the target sliced network, to obtain corrected link bandwidth corresponding to the target sliced network at the target moment, where the corrected link bandwidth corresponding to the target sliced network at the target moment includes corrected link bandwidth allocated to each aggregation flow in the target sliced network on each link in the target sliced network at the target moment.

Optionally, the network status of the target sliced network varies at different moments, and the queue status corresponding to the target sliced network varies at different moments.

A queue status corresponding to the target sliced network at the target moment includes: a real network status of the target sliced network at the target moment and observed noise of the target sliced network at the target moment.

The predicting a network status of the target sliced network based on the queue status corresponding to the target sliced network, to obtain a predicted network status includes:

determining a first covariance matrix for the observed noise of the target sliced network at the target moment;

determining a second covariance matrix for an aggregation flow in the target sliced network at the target moment; and calculating the network status of the target sliced network based on the queue status corresponding to the target sliced network at the target moment, the first covariance matrix, and the second covariance matrix to obtain a predicted network status of the target sliced network at the target moment, where the predicted network status is associated with the real network status.

Optionally, the corrected link bandwidth corresponding to the target sliced network at the target moment is:

$$\{f_{(u,v)}{}^n(t) = f_{(u,v)}{}^{n*} + \Delta f_{(u,v)}{}^n(t), \forall n, (u,v)\}.$$

t indicates the target moment, u indicates a source node of a link (u,v), v indicates a destination node of the link (u,v), ∀n indicates any aggregation flow n in the target sliced network, $f_{(u,v)}{}^{n*}$ indicates initial link bandwidth allocated to any aggregation flow n in the target sliced network on any link (u,v) in the target sliced network, $\Delta f_{(u,v)}{}^n(t)$ indicates a link bandwidth correction value corresponding to any aggregation flow n in the target sliced network on any link (u,v) in the target sliced network at the target moment, and $f_{(u,v)}{}^n(t)$ indicates corrected link bandwidth allocated to any aggregation flow n in the target sliced network on any link (u,v) in the target sliced network at the target moment.

Optionally, the queue status corresponding to the target sliced network at the target moment is:

$$Y_k(t) = Q_k(t-\tau k) + Z(t).$$

t indicates the target moment, $Q_k(t) = \{Q_i{}^n(t)\}$, $Z(t) = \{Z_i{}^n(t)\}$, k indicates a number of the target sliced network, $Y_k(t)$ indicates the queue status corresponding to the target sliced network at the target moment, $Y_k(t)$ is obtained through observation, $Q_k(t)$ indicates the real network status of the target sliced network at the target moment, $Q_i{}^n(t)$ indicates a queue status of an aggregation flow n corresponding to a switch i in the target sliced network at the target moment, Z(t) indicates the observed noise of the target sliced network at the target moment, $Z_i{}^n(t)$ indicates observed noise of the queue status of the aggregation flow n corresponding to the switch i in the target sliced network at the target moment, and $\tau_k$ indicates an observed delay of obtaining the queue status corresponding to the target sliced network by the target second controller.

According to a third aspect, a network control apparatus is provided, where the apparatus is applied to a first controller in a communications network, the communications network includes a first controller, at least one second controller, and at least one switch, the network control apparatus includes at least one module, and the at least one module is configured to implement the network control method provided in any one of the first aspect or the optional manners of the first aspect.

According to a fourth aspect, a network control apparatus is provided, where the apparatus is applied to a target second controller in a communications network, the communications network includes a first controller, at least one second controller, and at least one switch, the at least one second controller includes the target second controller, the network control apparatus includes at least one module, and the at least one module is configured to implement the network control method provided in any one of the second aspect or the optional manners of the second aspect.

According to a fifth aspect, a first controller is provided, where the first controller includes a processor, a transmitter, a receiver, and a network interface, and the processor, the transmitter, the receiver, and the network interface are connected by using a bus.

The processor includes one or more processing cores. The processor executes various function applications and processes data by running a software program and a unit.

There may be a plurality of network interfaces. The network interface is used for communication between the first controller and another storage device or network device.

The processor and the transmitter are configured to cooperatively complete the network control method provided in any one of the first aspect or the optional manners of the first aspect.

According to a sixth aspect, a second controller is provided, where the second controller includes a receiver, a processor, a transmitter, and a network interface, and the receiver, the processor, the transmitter, and the network interface are connected by using a bus.

The processor includes one or more processing cores. The processor executes various function applications and processes data by running a software program and a unit.

There may be a plurality of network interfaces. The network interface is used for communication between the second controller and another storage device or network device.

The receiver, the processor, and the transmitter are configured to cooperatively complete the network control method provided in any one of the second aspect or the optional manners of the second aspect.

According to a seventh aspect, a network control system is provided, where the network control system includes a first controller and at least one second controller, and the at least one second controller includes a target second controller.

In a possible implementation, the first controller includes the network control apparatus provided in any one of the third aspect or the optional manners of the third aspect, and the target second controller includes the network control apparatus provided in any one of the fourth aspect or the optional manners of the fourth aspect.

In another possible implementation, the first controller is the first controller provided in the fifth aspect, and the target second controller is the second controller provided in the sixth aspect.

According to an eighth aspect, a computer readable storage medium is provided, where the computer readable storage medium stores an instruction, and when the instruction runs on a processing component of a computer, the processing component performs the network control method provided in any one of the first aspect or the optional manners of the first aspect.

According to a ninth aspect, a computer readable storage medium is provided, where the computer readable storage medium stores an instruction, and when the instruction runs on a processing component of a computer, the processing component performs the network control method provided in any one of the second aspect or the optional manners of the second aspect.

According to a tenth aspect, a computer program product including an instruction is provided, where when the computer program product runs on a computer, the computer performs the network control method provided in any one of the first aspect or the optional manners of the first aspect.

According to an eleventh aspect, a computer program product including an instruction is provided, where when the computer program product runs on a computer, the computer performs the network control method provided in any one of the second aspect or the optional manners of the second aspect.

According to a twelfth aspect, a processing apparatus is provided, where the processing apparatus includes at least one circuit, and the at least one circuit is configured to perform the network control method provided in any one of the first aspect or the optional manners of the first aspect.

According to a thirteenth aspect, a processing apparatus is provided, where the processing apparatus includes at least one circuit, and the at least one circuit is configured to perform the network control method provided in any one of the first aspect or the optional manners of the first aspect.

The technical solutions provided in the embodiments of this application bring the following beneficial effects:

According to the network control method, apparatus, and system, and the storage medium provided in the embodiments of this application, the first controller slices the communications network to obtain a sliced network, and each sliced network is corresponding to one second controller. Each second controller performs, through closed-loop control based on the queue status of the corresponding sliced network, closed-loop correction on the initial link bandwidth allocated to each aggregation flow in the corresponding sliced network on each link in the corresponding sliced network, so that each switch in the corresponding sliced network transmits an aggregation flow based on the corrected link bandwidth. Therefore, the first controller and the second controller can cooperatively control the network, thereby reducing a delay and improving a network control effect.

BRIEF DESCRIPTION OF DRAWINGS

FIG. 4A and FIG. 4B are a method flowchart of a network control method according to an embodiment of this application;

DESCRIPTION OF EMBODIMENTS

Figure 1:
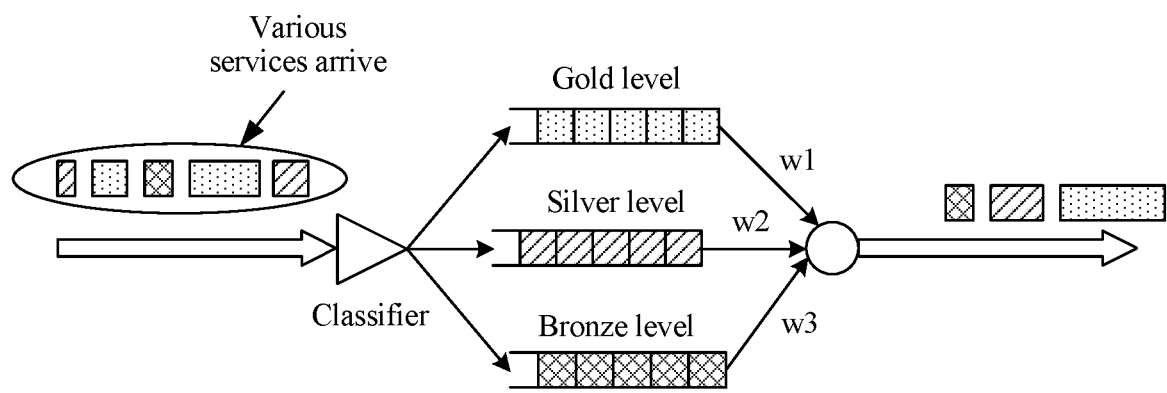
FIG. 1 is a schematic diagram of network control according to a related technology.

To make the objectives, technical solutions, and advantages of this application clearer, the following further describes this application in detail with reference to the accompanying drawings. Apparently, the described embodiments are merely some rather than all of the embodiments of this application.

Internet technologies have been developing rapidly over the past decades, and have brought ubiquitous convenience to production and life of human being. As the Internet technologies develop, more applications emerge in a network, and more terminal users are involved in the network. This increases network bearer services (such as a voice service, a video service, and an online gaming service). Because of different properties of various services, data streams with different properties are presented in the network, and a quantity of coexisting data streams in the network increases explosively. However, network resources are limited. How to properly allocate the limited network resources to a large quantity of data streams with different properties to maximize network resource utilization and optimize performance indicators of various services is an urgent problem to be resolved. This problem can be considered as a large-scale flow control optimization problem. It is also a difficult problem in current academic and industrial circles.

It should be noted that, in a conventional network architecture based on the Transmission Control Protocol (English: Transmission Control Protocol, TCP for short), an end side may adaptively adjust a transmission rate of a data stream (the transmission rate of the data stream may be understood as bandwidth allocated to the data stream on a link). However, TCP-based end side does not provide global optimal control. It can only ensure that the network is not congested, but cannot ensure that performance indicators of data streams with different properties are met and optimized. Therefore, the conventional TCP-based network architecture cannot essentially resolve the large-scale flow control optimization problem.

Existing large-scale flow control technologies mainly fall into two types: a distributed control technology and a centralized control technology. In this application, a differentiated services (English: Differentiated Services, DiffServ for short) technology is used as an example to describe the distributed control technology, and an SDN control technology is used as an example to describe the centralized control technology.

The DiffServ technology is a technology in which data streams are classified (or clustered) to obtain aggregation flows, and the data streams are scheduled at an aggregation flow level to implement large-scale flow control optimization. The DiffServ technology can classify hundreds of data streams in the network into several categories. Different categories are scheduled in a switch based on different priorities to control different data streams based on priorities and further implement differentiated services. For example, a voice service requires a continuous data stream to some extent to ensure call quality of a user terminal. Therefore, a data stream of the voice service requires a higher priority than a data stream of another service. In the DiffServ technology, queues and aggregation flows in a switch are in a one-to-one correspondence. The switch may use a flexible queue policy to implement differentiated services. For example, the switch may use a strict priority queue (English: rist Priority Queue, FPQ for short) policy to implement differentiated services. In the FPQ policy, a data stream of a high priority service is buffered in a high-level queue to ensure quality of service (English: Quality of Service, QoS for short), and a data stream of a low priority service is buffered in a low-level queue. For another example, the switch may use a weighted fair queue (English: Weighted Fair Queue, WFQ for short) policy to implement differentiated services. In the WFQ policy, higher bandwidth is allocated to a queue corresponding to a data stream of a high-level service to ensure QoS, and relatively low bandwidth is allocated to a queue corresponding to a data steam of a low-level service.

The following describes the DiffServ technology by using the WFQ policy as an example with reference to the accompanying drawings. Referring to FIG. 1, FIG. 1 shows a schematic diagram of a WFQ policy control network according to a related technology. Referring to FIG. 1, services in a network are classified into three levels: a gold level, a silver level, and a bronze level. Each level is corresponding to one queue. Priorities of the three levels are as follows: gold>silver>bronze. In large-scale flow control, when data streams of the services in the network arrive at a switch, a classifier in the switch may distribute the data streams to different queues based on different priorities and header (English: header) information of the data streams. The WFQ policy is used for dequeuing. A high-level queue occupies a higher proportion of bandwidth resources. For example, bandwidth proportions corresponding to the three queues in FIG. 1 may be w1=0.7, w2=0.25, and w3=0.05. Therefore, more bandwidth resources are allocated to a queue corresponding to a "gold" level service to ensure QoS for the gold level service. Because a "silver" level service and a "bronze" level service have lower QoS requirements than the "gold" level service, relatively fewer bandwidth resources are allocated to the "silver" level service and the "bronze" level service. It can be seen from FIG. 1 that, in the DiffServ technology, a priority queue manner is used to resolve a large-scale flow control problem and implement differentiated services for data streams. However, an idea of the DiffServ technology is a distributed heuristic algorithm, and therefore the DiffServ technology cannot ensure global optimal utilization of communications network resources.

Figure 2:
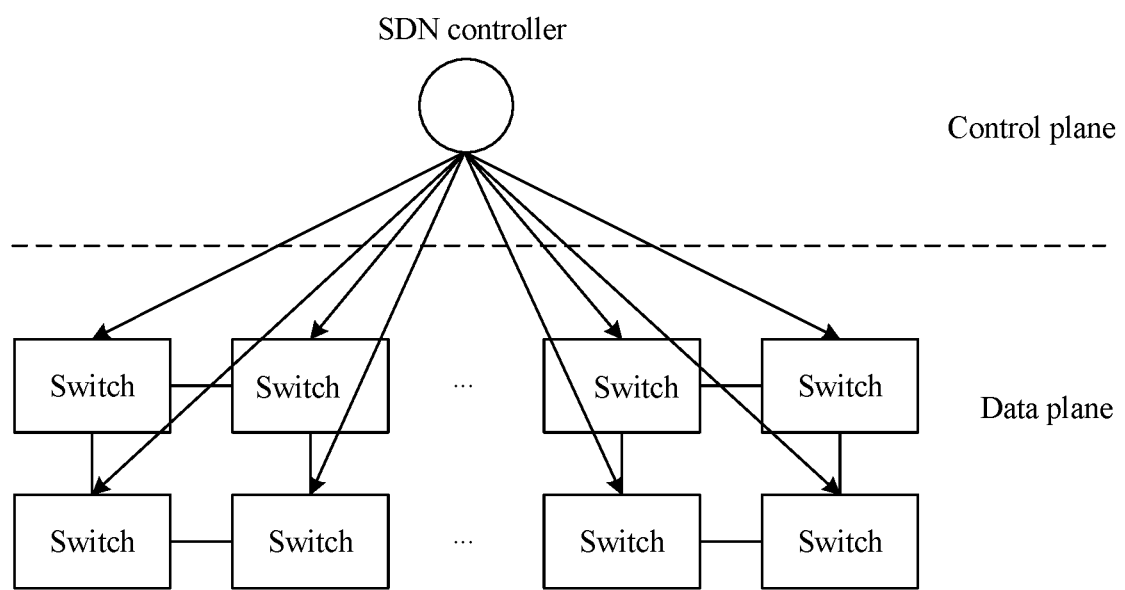
FIG. 2 is a schematic diagram of another type of network control according to a related technology.

As a popular technology, the SDN control technology is widely concerned in academic and industrial circles in recent years. The SDN control technology is a new type of network innovation architecture developed by the Clean Slate research group at Stanford University in the United States in 2006. FIG. 2 shows a diagram of a network architecture of the SDN control technology. As shown in FIG. 2, an SDN network includes an SDN controller and a plurality of switches controlled by the SDN controller. Different from a conventional network in which a routing table of a data plane is generated on a control plane through calculation based on a distributed routing protocol, in the SDN control technology, the SDN controller centrally collects global network information on a control plane, calculates a network resource allocation rule (such as a forwarding rule) based on the global network information, and then delivers the network resource allocation rule to a switch through an open southbound interface of the SDN controller. In this way, each switch learns a corresponding network resource control decision, and data packet forwarding behavior in the SDN network can be flexibly controlled by using software. To achieve this effect, the control plane and the data plane that are coupled in the conventional network are separated in the SDN network to form an independent infrastructure layer (that is, a data plane in FIG. 2) and a control layer (that is, a control plane in FIG. 2). The infrastructure layer includes the switches and is responsible for data packet forwarding. The control layer includes the SDN controller. A data packet forwarding rule is generated by the SDN controller on the control layer.

The SDN control technology can implement functions such as network throughput enhancement, resource optimization and allocation, and congestion control through global control by the SDN controller. However, in a control process of the SDN control technology, the SDN controller needs to collect the global network information (such as statuses of all data streams in the network), calculate the network resource allocation rule based on the global network information, and allocate a control decision to each switch. Delays exist in processes of collecting the global network information, calculating the network resource allocation rule, and allocating the control decision to each switch by the SDN controller. Overall SDN network control is extremely sensitive to these delays. When a network scale is extremely large, a transmission delay and an SDN controller responding delay may be extremely high. These unfavorable delay factors may lead to a control decision failure, cause significant losses in network resource utilization and data stream performance, and greatly affect network performance. The SDN control technology focuses on optimizing steady-state network performance to meet an average bandwidth requirement of different data streams, but neglects a dynamic process of effectively pulling the network to a steady state. In addition, the SDN control technology uses a global control manner to eliminate traffic requirement fluctuation. In a whole control process, performance may sharply deteriorate because of an expanded network scale. Therefore, centralized SDN control cannot process an uncertainty in the network, and cannot robustly adapt to a rapidly changing network disturbance factor. Global SDN control is non-scalable and cannot resolve the large-scale flow control optimization problem.

In a human fast/slow nerve architecture, a slow nerve in a human brain is separately connected to all human organs and a brain gray matter nerve. The brain constantly learns external world changes to form human capabilities such as a language, an idea, logic, and an emotion. A fast nerve in a local human organ uses a reflex nerve in the local organ to respond to an external rapidly changing environmental disturbance factor. The slow nerve in the human brain and the fast nerve in the local human organ cooperatively work, are responsible for different functions, and complete complex human activity behavior through flexible information exchange and coordination. For example, a human arm controls a balance pole. The brain needs to learn to generate a decision-making action when an event of controlling a balance pole by a human arm happens for the first time or happens occasionally. Specifically, after human eyes observe the pole, a vision is formed in the brain. The brain generates an action after a delay and delivers the action to the arm, so that the arm performs the action to control balance of the pole. In addition, the slow nerve in the brain stores the action in the cerebellum by using an auxiliary visual system. When the event of controlling a balance pole by a human arm happens again, the arm can perform the corresponding action to control balance of the pole without a need of learning by the brain. Specifically, when human eyes observe the pole, a vision is formed in the auxiliary visual system and then transmitted to the cerebellum. The cerebellum transmits the corresponding action to the arm based on the vision. A fast nerve in the arm controls the arm to perform the corresponding action. It can be learned from the above that when an event of holding a pole by a human arm happens again, the brain does not need to be used. Therefore, a delay can be reduced, and the arm can quickly perform the corresponding action.

Inspired by the human fast/slow nerve architecture, the embodiments of this application provide a network control method, apparatus, and system to resolve the large-scale flow control optimization problem. The embodiments relate to a network architecture combining fast control and slow control. The network architecture includes a slow controller (equivalent to the slow nerve in the human fast/slow nerve architecture) and at least one fast controller (equivalent to the fast nerve in the human fast/slow nerve architecture). The slow controller optimizes a network through complex calculation in a large time scale, and is responsible for sensing a relatively slowly changing factor in the network (for example, a network topology, link bandwidth, and a traffic statistics characteristic such as an average value or a variance of aggregation flows). The fast controller optimizes the network through a simple operation in a small time scale, and is responsible for sensing a relatively rapidly changing factor in the network (for example, a link status and a queue status) to counter a real-time traffic disturbance change. According to the network control method, apparatus, and system, and the storage medium provided in the embodiments of this application, the slow controller grasps global network information, and optimizes the network at an aggregation flow level based on the global network information. The optimization can maximize network resource utilization, and ensure bandwidth requirements and QoS requirements of various services at the aggregation flow level. The fast controller further optimizes and configures the network at a data stream level (or granularity) through local optimization based on a result of aggregation flow-based optimization performed by the slow controller, to respond to a time-varying traffic flow characteristic. The large-scale flow control optimization problem is resolved in the manner of combining fast control and slow control in the embodiments of this application. For related descriptions of the network control method, apparatus, and system, and the storage medium provided in the embodiments of this application, refer to the following embodiments.

Figure 3:
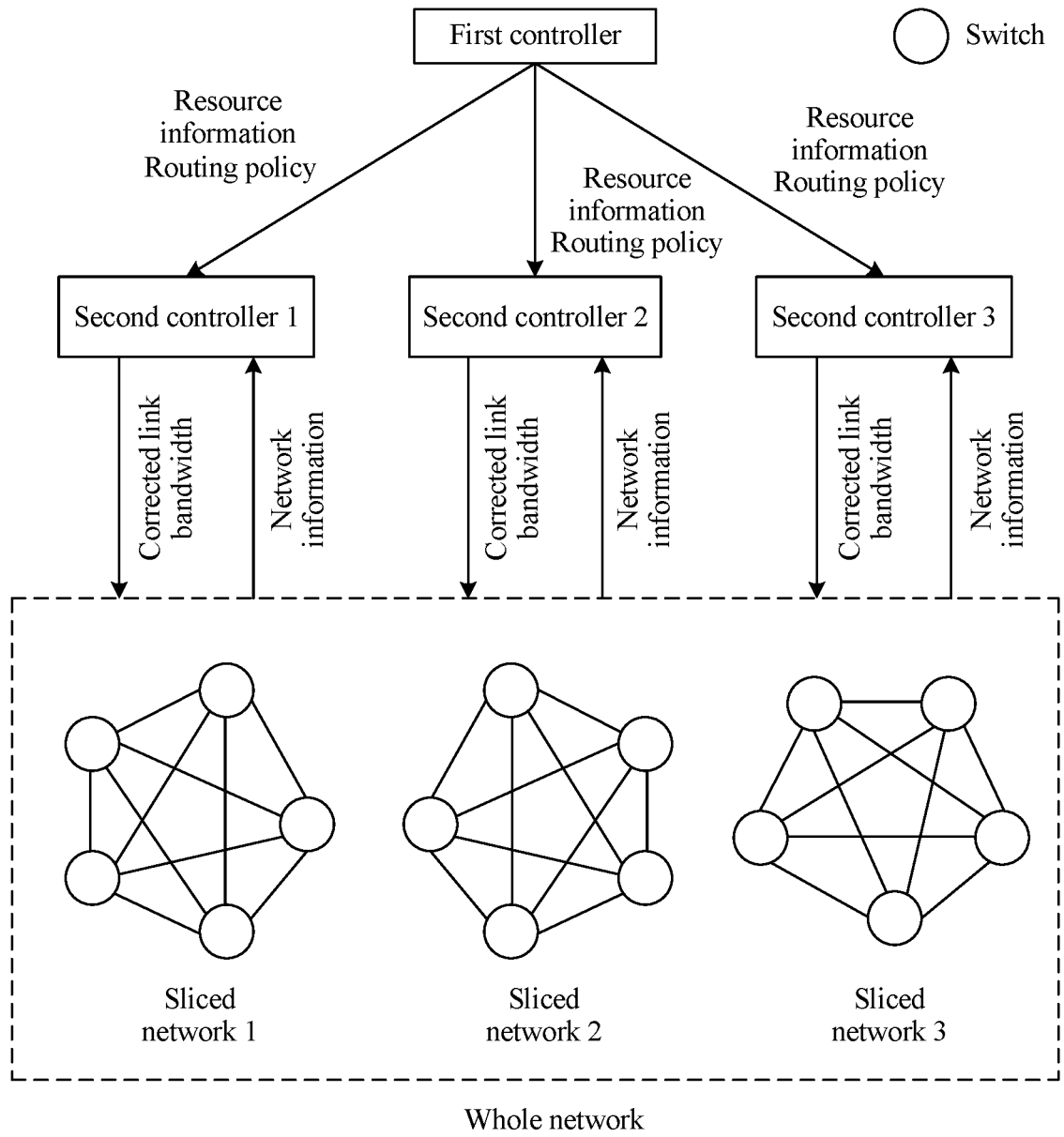
FIG. 3 is a schematic diagram of an implementation environment according to an embodiment of this application.

Referring to FIG. 3, FIG. 3 shows a schematic structural diagram of an implementation environment according to an embodiment of this application. Referring to FIG. 3, the implementation environment includes: a first controller, at least one second controller, and at least one switch. The first controller may be a slow controller. The at least one second controller may include a second controller 1, a second controller 2, and a second controller 3. Each second controller may be a fast controller. Any two switches in the at least one switch are connected to form a link. The first controller may be alternatively referred to as an overall controller. The second controller may be alternatively referred to as a slicing controller.

The first controller may obtain global network information, and slice a communications network based on the global network information to obtain at least one sliced network. Each sliced network may include at least one switch, and each sliced network is corresponding to one second controller. After slicing the communications network, the first controller may determine resource information of the at least one sliced network, and send resource information of a corresponding sliced network to a second controller corresponding to each sliced network. Resource information of each sliced network may include initial link bandwidth allocated to each aggregation flow in each sliced network on each link in each sliced network.

A target second controller is a second controller corresponding to a target sliced network. The target sliced network is any sliced network in the at least one sliced network. After receiving resource information of the target sliced network, the target second controller may obtain a queue status corresponding to the target sliced network, perform, through closed-loop control based on the queue status corresponding to the target sliced network, closed-loop correction on initial link bandwidth allocated to each aggregation flow in the target sliced network on each link in the target sliced network, to obtain corrected link bandwidth corresponding to the target sliced network, and deliver corresponding corrected link bandwidth to each switch in the target sliced network, so that each switch transmits a corresponding aggregation flow based on the corresponding corrected link bandwidth. The queue status corresponding to the target sliced network includes a queue status corresponding to each switch in the target sliced network. Each switch is corresponding to one queue.

Figure 4A:
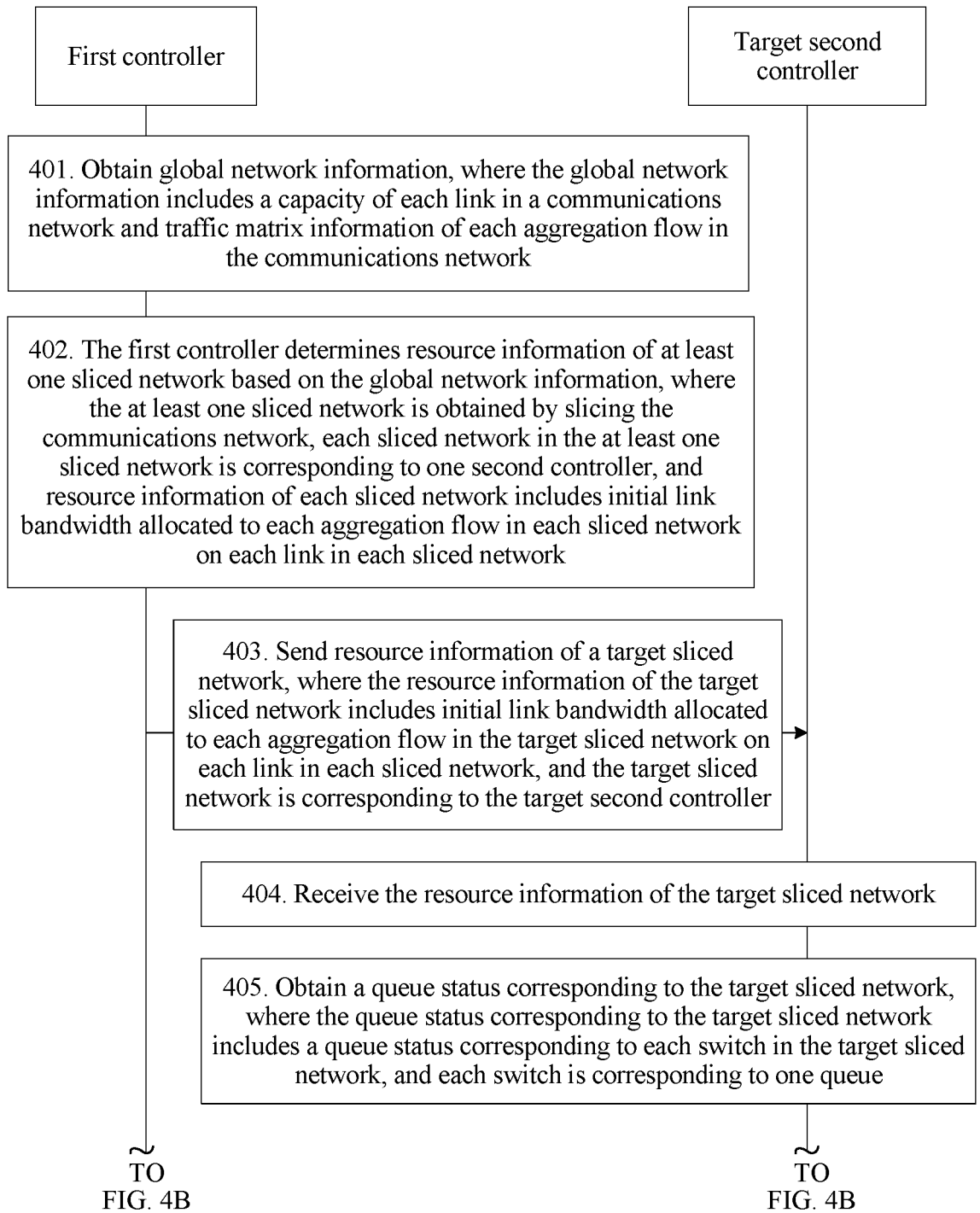

Referring to FIG. 4A and FIG. 4B, FIG. 4A and FIG. 4B show a method flowchart of a network control method according to an embodiment of this application. Referring to FIG. 4A and FIG. 4B, the network control method includes the following steps.

Step 401: A first controller obtains global network information, where the global network information includes a capacity of each link in a communications network and traffic matrix information of each aggregation flow in the communications network.

Each aggregation flow in the communications network is obtained by classifying all traffic flows in the communications network by the first controller. A traffic flow may be a data stream, a video stream, a voice stream, or the like of a service, which is not limited in this embodiment of this application.

The first controller may obtain the global network information. The global network information may include: the capacity of each link in the communications network and the traffic matrix information of each aggregation flow in the communications network. The global network information may further include a network topology structure of the communications network. The network topology structure of the communications network is used to indicate a connection relationship between switches (alternatively referred to as nodes; each node in the communications network has one switch) in the communications network. The capacity of each link in the communications network may be $\{c_{(u,v)}, \forall (u,v)\}$, where u indicates a source node (or a source switch) of a link (u,v), v indicates a destination node (or a destination switch) of the link (u,v), $c_{(u,v)}$ indicates a capacity of the link (u,v), and $\forall(u,v)$ indicates any link (u,v) in the communications network. The traffic matrix information of each aggregation flow in the communications network may be $\{V^n, \forall n\}$, where $V^n$ indicates a bandwidth requirement of an aggregation flow n, and $\forall n$ indicates any aggregation flow n in the communications network.

Optionally, each switch in the communications network may report network information to the first controller; and the first controller receives the network information reported by each switch, and collects the network information reported by each switch to obtain the global network information. Alternatively, the first controller may actively obtain network information from each switch, and collect the network information obtained from all switches to obtain the global network information. Alternatively, the first controller may obtain the global network information in another manner, which is not limited in this embodiment of this application.

Step 402: The first controller determines resource information of at least one sliced network based on the global network information, where the at least one sliced network is obtained by slicing the communications network, each sliced network in the at least one sliced network is corresponding to one second controller, and resource information of each sliced network includes initial link bandwidth allocated to each aggregation flow in each sliced network on each link in each sliced network.

Optionally, the first controller may first slice the communications network based on the global network information to obtain the at least one sliced network, and then determine the resource information of the at least one sliced network based on the global network information. Each sliced network in the at least one sliced network may include at least one switch. Each sliced network in the at least one sliced network may be corresponding to one second controller. The resource information of each sliced network includes the initial link bandwidth allocated to each aggregation flow in each sliced network on each link in each sliced network. For example, as shown in FIG. 3, the first controller slices the communications network to obtain a sliced network 1, a sliced network 2, and a sliced network 3. Each of the sliced network 1, the sliced network 2, and the sliced network 3 includes five switches. The sliced network 1 is corresponding to a second controller 1; the sliced network 2 is corresponding to a second controller 2; and the sliced network 3 is corresponding to a second controller 3.

Optionally, the first controller may determine the resource information of the at least one sliced network by calculating a traffic engineering (English: Traffic Engineering, TE for short) issue. The resource information of each sliced network may be $\{f_{(u,v)}^{n*}, \forall n,(u,v)\}$, indicating initial link bandwidth allocated to any aggregation flow n in each sliced network on any link (u,v) in each sliced network.

In this embodiment of this application, that the first controller determines resource information of at least one sliced network based on the global network information may include: determining, by the first controller, the resource information of the at least one sliced network based on the capacity of each link in the communications network and the traffic matrix information of each aggregation flow in the communications network when a target function uses a minimum value. The target function meets a first constraint, a second constraint, a third constraint, a fourth constraint, and a fifth constraint. The target function, the first constraint, the second constraint, the third constraint, the fourth constraint, and the fifth constraint are as follows:

The target function is $$y = \max_{(u,v)} \sum_n \frac{f_{(u,v)}^{n*}}{c_{(u,v)}}.$$

The first constraint is $$\sum_w f_{(w,d)}^{n*} = V^n, \text{ and } \forall\, d$$

is a destination node of the aggregation flow n.

The second constraint is $$\sum_w f_{(s,w)}^{n*} = V^n, \text{ and } \forall\, s$$

is a source node of the aggregation flow n.

The third constraint is $$\sum_u f_{(u,v)}^{n*} = \sum_{u'} f_{(v,u')}^{n*}, \forall\, v,$$

n.

The fourth constraint is $$\sum_n f_{(u,v)}^{n*} \le c_{(u,v)}, \forall\, (u,v).$$

The fifth constraint is $f_{(u,v)}^{n*} \ge 0$, $\forall(u,v)$, n.

In the target function, the first constraint, the second constraint, the third constraint, the fourth constraint, and the fifth constraint, $f_{(u,v)}^{n*}$ indicates initial link bandwidth allocated to any aggregation flow n in the communications network on any link (u,v) in the communications network, $f_{(u,v)}^{n*}/c_{(u,v)}$ indicates initial usage of any aggregation flow n in the communications network on any link (u,v) in the communications network, $$\sum_n \frac{f_{(u,v)}^{n*}}{c_{(u,v)}}$$

indicates a sum of initial usage of all aggregation flows n in the communications network on any link (u,v) in the communications network, $$\max_{(u,v)} \sum_n \frac{f_{(u,v)}^{n*}}{c_{(u,v)}}$$

indicates a maximum value in sums of initial usage of all aggregation flows n in the communications network on each link (u,v) in the communications network, $$\sum_w f_{(w,d)}^{n*}$$

indicates a sum of initial link bandwidth occupied by any aggregation flow n in the communications network on all links (w,d) that use a node d as a destination node in the communications network, $$\sum_w f_{(s,w)}^{n*}$$

indicates a sum of initial link bandwidth occupied by any aggregation flow n in the communications network on all links (s,w) that use a node s as a source node in the communications network, $$\sum_u f_{(u,v)}^{n*}$$

indicates a sum of initial link bandwidth occupied by any aggregation flow n in the communications network on all upstream links of a node v in the communications network, $$\sum_{u'} f_{(v,u')}^{n*}$$

indicates a sum of initial link bandwidth occupied by any aggregation flow n in the communications network on all downstream links of the node v in the communications network, and $$\sum_n f_{(u,v)}^{n*}$$

indicates a sum of initial link bandwidth allocated to all aggregation flows n in the communications network on any link (u,v) in the communications network.

It should be noted that, in the first to the fifth constraints, the first to the third constraints are traffic balancing constraints, that is, for each aggregation flow, a service speed (or link bandwidth) matches an aggregation flow arriving speed (or link bandwidth) on each node; the fourth constraint is a link bandwidth constraint, that is, the sum of the initial link bandwidth allocated to all aggregation flows n in the communications network on any link (u,v) in the communications network needs to be lower than a capacity of any link (u,v); the fifth constraint is a non-negative constraint, that is, the initial link bandwidth allocated to any aggregation flow n in the communications network on any link (u,v) in the communications network is greater than or equal to 0.

The first controller may use the global network information as an input, and solve $f_{(u,v)}^{n*}$ in the target function when the target function uses the minimum value, to obtain the initial link bandwidth allocated to any aggregation flow n in the communications network on any link (u,v) in the communications network, and further obtain resource information of a sliced network.

Step 403: The first controller sends resource information of a corresponding sliced network to each second controller.

After determining the resource information of the at least one sliced network, the first controller may send the resource information of the corresponding sliced network to each second controller. For example, as shown in FIG. 3, the first controller sends resource information of the sliced network 1 to the second controller 1, sends resource information of the sliced network 2 to the second controller 2, and sends the resource information of the sliced network 3 to the second controller 3. For a process of sending the resource information of the corresponding sliced network to each second controller by the first controller, refer to a related technology. Details are not described in this embodiment of this application.

It should be noted that, in actual application, new switches are constantly added to a network to form new links. To fully control the network, after obtaining the global network information, the first controller may further determine, based on the global network information, a routing policy corresponding to the at least one sliced network, and then send a corresponding routing policy to each second controller. A routing policy corresponding to each sliced network includes a routing policy corresponding to each aggregation flow in each sliced network. Optionally, the first controller may determine the routing policy corresponding to the at least one sliced network while determining the resource information of the at least one sliced network. That is, in step 402, the first controller may obtain, through calculation, the routing policy corresponding to the at least one sliced network while calculating the TE issue. Specifically, the first controller obtains, by solving the target function, the routing policy corresponding to the at least one sliced network.

Step 404: A target second controller receives resource information of a target sliced network sent by the first controller.

When the first controller sends the resource information of the corresponding sliced network to each second controller, each second controller may receive the resource information of the corresponding sliced network. In this embodiment of this application, the target sliced network may be any sliced network in the at least one sliced network obtained by the first controller by slicing the communications network. The target second controller is a second controller corresponding to the target sliced network. The target second controller may receive the resource information of the target sliced network sent by the first controller. The resource information of the target sliced network may include initial link bandwidth allocated to each aggregation flow in the target sliced network on each link in each sliced network. For example, as shown in FIG. 3, the target sliced network may be the sliced network 1, the sliced network 2, or the sliced network 3. The target second controller may be the second controller 1, the second controller 2, or the second controller 3. This embodiment of this application is described by using an example in which the target sliced network is the sliced network 1, and the target second controller is the second controller 1. The second controller 1 may receive resource information of the sliced network 1 sent by the first controller. For a process of receiving, by the target second controller, the resource information of the target sliced network sent by the first controller in this embodiment of this application, refer to a related technology. Details are not described in this embodiment of this application.

Step 405: The target second controller obtains a queue status corresponding to the target sliced network, where the queue status corresponding to the target sliced network includes a queue status corresponding to each switch in the target sliced network, and each switch is corresponding to one queue.

After receiving the resource information of the target sliced network, the target second controller may obtain the queue status corresponding to the target sliced network. The queue status corresponding to the target sliced network includes the queue status corresponding to each switch in the target sliced network. Each switch is corresponding to one queue. Each queue may be used to buffer one aggregation flow.

For example, as shown in FIG. 3, the second controller 1 obtains a queue status corresponding to the sliced network 1. If the sliced network 1 includes a switch 11, a switch 12, a switch 13, a switch 14, and a switch 15, queue statuses that are corresponding to the sliced network 1 and that are obtained by the second controller 1 include: a queue status of a queue corresponding to the switch 11, a queue status of a queue corresponding to the switch 12, a queue status of a queue corresponding to the switch 13, a queue status of a queue corresponding to the switch 14, and a queue status of a queue corresponding to the switch 15.

In this embodiment of this application, a switch in each sliced network may report network information to a corresponding second controller, where the network information includes a queue status corresponding to the switch in each sliced network; and the corresponding second controller may receive network information reported by a switch in a corresponding sliced network, to obtain a queue status corresponding to the corresponding sliced network. Optionally, the switch 11, the switch 12, the switch 13, the switch 14, and the switch 15 all report network information to the second controller 1; and the second controller 1 receives the network information reported by the switch 11, the switch 12, the switch 13, the switch 14, and the switch 15, to obtain the queue statuses corresponding to the sliced network 1. In this embodiment of this application, the queue status that is corresponding to the target sliced network and that is obtained by the target second controller may be specifically an observed value of the queue status corresponding to the target sliced network. Therefore, the queue status that is corresponding to the target sliced network and that is obtained by the target second controller may be alternatively referred to as an observed queue status corresponding to the target sliced network. This is not limited in this embodiment of this application.

Optionally, in this embodiment of this application, a network status of the target sliced network varies at different moments, and the queue status corresponding to the target sliced network varies at different moments. Therefore, the target second controller may obtain, in real time, the queue status corresponding to the target sliced network. A queue status corresponding to the target sliced network at a target moment includes: a real network status of the target sliced network at the target moment and observed noise of the target sliced network at the target moment. Specifically, the queue status corresponding to the target sliced network at the target moment may be:

$$Y_k(t)=Q_k(t-\tau k)+Z(t).$$

t indicates the target moment; $Q_k(t)=\{Q_i^n(t)\}$; $Z(t)=\{Z_i^n(t)\}$; k indicates a number of the target sliced network (k=1 in this embodiment of this application), $Y_k(t)$ indicates the queue status corresponding to the target sliced network at the target moment; $Y_k(t)$ is obtained through observation, and therefore $Y_k(t)$ may be referred to as an observed value of the queue status corresponding to the target sliced network at the target moment, or $Y_k(t)$ may be alternatively referred to as an observed queue status corresponding to the target sliced network at the target moment; $Q_k(t)$ indicates the real network status of the target sliced network at the target moment; $Q_i^n(t)$ indicates a queue status of an aggregation flow n corresponding to a switch i (for example, the switch 11) in the target sliced network at the target moment; $Z(t)$ indicates the observed noise of the target sliced network at the target moment; $Z_i^n(t)$ indicates observed noise of the queue status of the aggregation flown corresponding to the switch i in the target sliced network at the target moment; and $\tau_k$ indicates an observed delay of obtaining the queue status corresponding to the target sliced network by the target second controller.

It should be noted that, because a process of obtaining the queue status corresponding to the target sliced network by the target second controller needs to take a period of time, there is a time difference between a moment at which the target second controller starts to obtain the queue status corresponding to the target sliced network and a moment at which the target second controller obtains the queue status corresponding to the target sliced network. Therefore, that the target second controller obtains, in real time, the queue status corresponding to the target sliced network may be understood as that the target second controller periodically obtains the queue status corresponding to the target sliced network. In this embodiment of this application, the target moment may be considered as any moment in a current period. The current period is a period in which the target second controller obtains the queue status corresponding to the target sliced network in step 405. The target moment may be a moment at which the target second controller obtains the queue status corresponding to the target sliced network in the current period, or may be a moment after the target second controller obtains the queue status corresponding to the target sliced network in the current period. This is not limited in this embodiment of this application.

Step 406: The target second controller performs, through closed-loop control based on the queue status corresponding to the target sliced network, closed-loop correction on initial link bandwidth allocated to each aggregation flow in the target sliced network on each link in the target sliced network, to obtain corrected link bandwidth corresponding to the target sliced network, where the corrected link bandwidth corresponding to the target sliced network includes corrected link bandwidth allocated to each aggregation flow in the target sliced network on each link in the target sliced network.

After obtaining the queue status corresponding to the target sliced network, the target second controller may perform, through closed-loop control based on the queue status corresponding to the target sliced network, closed-loop correction on the initial link bandwidth allocated to each aggregation flow in the target sliced network on each link in the target sliced network, to obtain the corrected link bandwidth corresponding to the target sliced network. In this embodiment of this application, the corrected link bandwidth corresponding to the target sliced network varies at different moments. Therefore, at each moment, the target second controller needs to perform, through closed-loop control, closed-loop correction on the initial link bandwidth allocated to each aggregation flow in the target sliced network on each link in the target sliced network.

Figure 5:
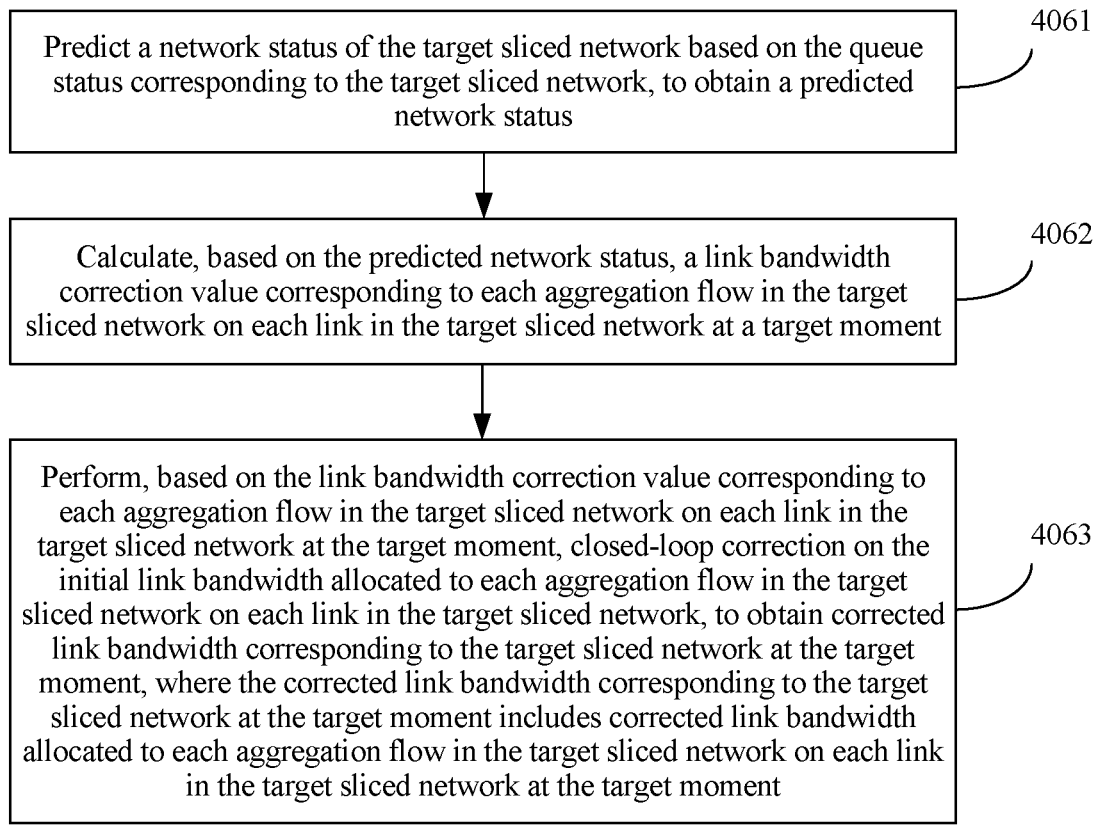
FIG. 5 is a flowchart of a method for performing closed-loop correction on initial link bandwidth allocated to each aggregation flow in a target sliced network on each link in the target sliced network according to an embodiment of this application.

For example, referring to FIG. 5, FIG. 5 shows a flowchart of a method for performing, by a target second controller, closed-loop correction on initial link bandwidth allocated to each aggregation flow in a target sliced network on each link in the target sliced network according to an embodiment of this application. Referring to FIG. 5, the method includes the following steps.

Substep 4061: Predict a network status of the target sliced network based on the queue status corresponding to the target sliced network, to obtain a predicted network status.

The target second controller may predict the network status of the target sliced network based on the queue status corresponding to the target sliced network, to obtain the predicted network status. For example, the second controller 1 predicts a network status of the sliced network 1 based on the queue status corresponding to the sliced network 1.

In this embodiment of this application, as described in step 405, the network status of the target sliced network varies at different moments, and the queue status corresponding to the target sliced network varies at different moments. Therefore, the target second controller may predict a network status of the target sliced network at each moment. The queue status corresponding to the target sliced network at the target moment includes: the real network status of the target sliced network at the target moment and the observed noise of the target sliced network at the target moment.

Figure 6:
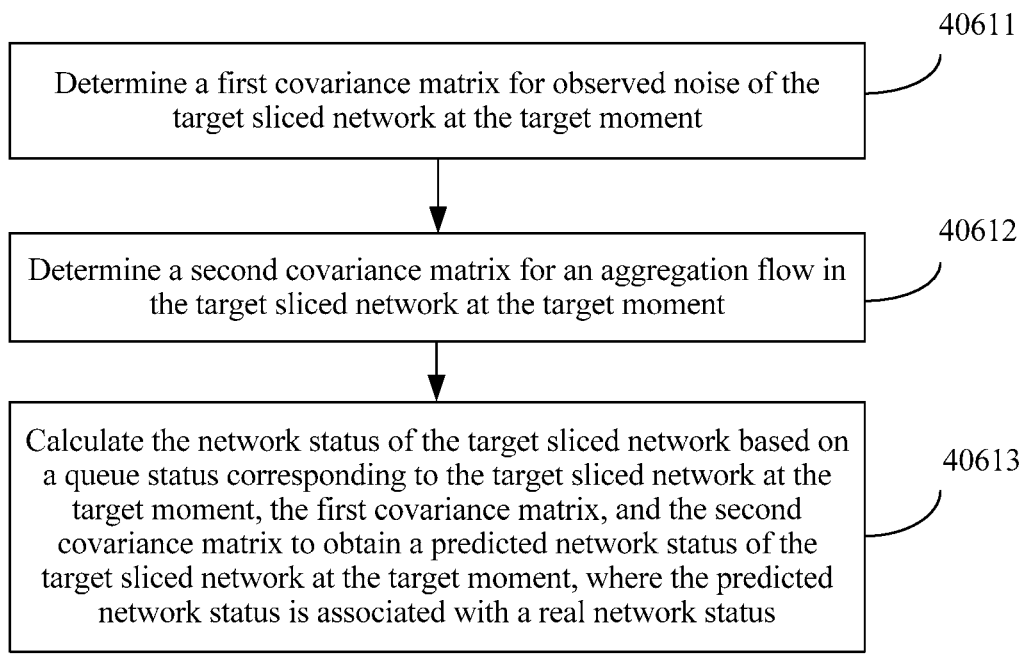
FIG. 6 is a flowchart of a method for predicting a network status of a target sliced network based on a queue status

For example, referring to FIG. 6, FIG. 6 shows a flowchart of a method for predicting a network status of a target sliced network by a target second controller according to an embodiment of this application. Referring to FIG. 6, the method includes the following steps.

Substep 40611: Determine a first covariance matrix for observed noise of the target sliced network at a target moment.

It can be learned based on the foregoing description that the queue status corresponding to the target sliced network at the target moment includes: the real network status of the target sliced network at the target moment and the observed noise of the target sliced network at the target moment. Therefore, the target second controller may determine the first covariance matrix for the observed noise of the target sliced network at the target moment. The first covariance matrix may be shown as follows:

$$\mathrm{Cov}_k(Z) = \begin{pmatrix} \mathrm{Var}(z_1) & \mathrm{Cov}(z_1, z_2) & \ldots & \mathrm{Cov}(z_1, z_i) \\ \mathrm{Cov}(z_1, z_2) & \mathrm{Var}(z_2) & \ldots & \mathrm{Cov}(z_1, z_{i-1}) \\ \vdots & \vdots & \ldots & \vdots \\ \mathrm{Cov}(z_1, z_i) & \mathrm{Cov}(z_1, z_{i-1}) & \ddots & \mathrm{Var}(z_i) \end{pmatrix}.$$

k indicates the number of the target sliced network, $\mathrm{Cov}_k(Z)$ indicates, the first covariance matrix for the observed noise of the target sliced network at the target moment, $\mathrm{Var}(z_i)$ indicates a variance of observed noise of a queue status of a queue corresponding to the switch i in the target sliced network, and $\mathrm{Cov}(z_1, z_i)$ indicates a covariance between observed noise of a queue status of a queue corresponding to a switch 1 in the target sliced network and the observed noise of the queue status of the queue corresponding to the switch i.

Substep 40612: Determine a second covariance matrix for an aggregation flow in the target sliced network at the target moment.

The target second controller may determine the second covariance matrix for the aggregation flow in the target sliced network at the target moment. The second covariance matrix may be shown as follows:

$$\text{Cov}_k(V) = \begin{pmatrix} \text{Var}(V^1) & \text{Cov}(V^1, V^2) & \cdots & \text{Cov}(V^1, V^i) \\ \text{Cov}(V^1, V^2) & \text{Var}(V^2) & \cdots & \text{Cov}(V^1, V^{i-1}) \\ \vdots & \vdots & \cdots & \vdots \\ \text{Cov}(V^1, V^i) & \text{Cov}(V^1, V^{i-1}) & \ddots & \text{Var}(V^i) \end{pmatrix}.$$

k indicates the number of the target sliced network, $\text{Cov}_k(V)$ indicates the second covariance matrix for the aggregation flow in the target sliced network at the target moment, $\text{Var}(V^i)$ indicates a variance of a bandwidth requirement of the queue corresponding to the switch i in the target sliced network, and $\text{Cov}(V^1, V^i)$ indicates a covariance between a bandwidth requirement of the queue corresponding to the switch 1 in the target sliced network and the bandwidth requirement of the queue corresponding to the switch i.

It should be noted that, for a process of determining the first covariance matrix in step 40611 and a process of determining the second covariance matrix in step 40612, refer to a related technology. Details are not described in this embodiment of this application.

Substep 40613: Calculate the network status of the target sliced network based on a queue status corresponding to the target sliced network at the target moment, the first covariance matrix, and the second covariance matrix to obtain a predicted network status of the target sliced network at the target moment, where the predicted network status is associated with a real network status.

After determining the first covariance matrix for the observed noise of the target sliced network at the target moment and the second covariance matrix for the aggregation flow in the target sliced network at the target moment, the target second controller may calculate the network status of the target sliced network based on the queue status corresponding to the target sliced network at the target moment, the first covariance matrix, and the second covariance matrix to obtain the predicted network status of the target sliced network at the target moment. The predicted network status of the target sliced network at the target moment is associated with the real network status of the target sliced network at the target moment.

Substep 4062: Calculate, based on the predicted network status, a link bandwidth correction value corresponding to each aggregation flow in the target sliced network on each link in the target sliced network at the target moment.

After predicting the network status of the target sliced network, the target second controller may calculate, based on the predicted network status of the target sliced network, the link bandwidth correction value corresponding to each aggregation flow in the target sliced network on each link in the target sliced network at the target moment.

In this embodiment of this application, the target second controller may calculate, by using a Kalman filtering control idea, the link bandwidth correction value corresponding to each aggregation flow in the target sliced network on each link in the target sliced network. A specific calculation process is as follows:

A network dynamic change equation in the Kalman filtering control idea is as follows:

$$Q_v^n(t+1) = \begin{cases} Q_v^n(t) - \sum_{m \in k(n)} \sum_{u' \in DL(v)} \Delta f_{(v,u')}^m(t) + \sum_{m \in k(n)} \sum_{u \in UL(v)} \Delta f_{(u,v)}^m(t), & \text{intra-network node} \\ Q_v^n(t) - \sum_{m \in k(n)} \sum_{u' \in DL(v)} \Delta f_{(v,u')}^m(t) + \sum_{m \in k(n)} \Delta V^m(t), & \text{network edge node} \end{cases}$$

In the network dynamic change equation, $Q_v^n(t)$ indicates a queue length of an aggregation flow n buffered in a switch v at a moment t, k indicates the number of the target sliced network, k(n) indicates a set of data streams included in the aggregation flow n in the target sliced network, m indicates any data stream in the aggregation flow n in the target sliced network, DL(v) indicates a set of end points of downstream links of the switch v, u' indicates an end point of any downstream link of the switch v in the target sliced network, $\Delta f_{(v,u')}^m(t)$ indicates a link bandwidth correction value corresponding to a data stream m in the target sliced network on any downstream link (v,u') of the switch v in the target sliced network at the moment t, UL(v) indicates a set of start points of upstream links of the switch v, u indicates a start point of any upstream link of the switch v in the target sliced network, $\Delta f_{(v,u)}^m(t)$ indicates a link bandwidth correction value corresponding to the data stream m in the target sliced network on any upstream link (u,v) of the switch v in the target sliced network at the moment t, and $\Delta V^m(t)$ indicates a fluctuation, around an average value of link bandwidth of the data stream m in the target sliced network, of the link bandwidth correction value of the data stream m in the target sliced network at the moment t. It can be learned that a network status (for example, $Q_v^n(t+1)$) at a moment t+1 is related to a network status (for example, $Q_v^n(t)$) at the moment t, a network action (for example, $\Delta f_{(v,u)}^m(t)$) at the moment t, and a traffic change (for example, $\Delta V^m(t)$) at the moment t. In the target sliced network, the network dynamic change equation is sorted into a vector or a matrix form, and may be shown as follows:

$$Q_k(t+1) = Q_k(t) - B_k \times \Delta F_k(t) + E_k \times \Delta V_k(t).$$

As described in step 405, $Q_k(t) = \{Q_i^n(t)\}$, k indicates the number of the target sliced network, and $Q_i^n(t)$ indicates a queue status of the aggregation flow n corresponding to the switch i in the target sliced network at the moment t. $\Delta F_k = \{\Delta f_{(u,v)}^m, \forall m, (u,v)\}$, $\Delta f_{(u,v)}^m$ indicates a link bandwidth correction value) corresponding to any data stream m in the target sliced network on any link (u,v) in the target sliced network, $\Delta V_k = \{\Delta V^m, \forall m\}$, and $\Delta V^m$ indicates a fluctuation, around an average value of link bandwidth of any data stream m in the target sliced network, of a link bandwidth correction value of any data stream m in the target sliced network.

With reference to the queue status $Y_k(t) = Q_k(t-\tau_k) + Z(t)$ corresponding to the target sliced network at the moment t (the target moment) in step 405, it may be determined that a process of calculating, based on the predicted network status, the link bandwidth correction value corresponding to each aggregation flow in the target sliced network on each link in the target sliced network at the target moment in substep 4062 may be as follows:

$$\hat{Q}_k(t+1) = \hat{Q}_k(t) - B_k \times \Delta F_k(t) + P_k \times (P_k + \text{Cov}_k(Z))^{-1} \times \left( Y_k(t) - \hat{Q}_k(t-\tau_k) - \sum_{t'=t-\tau}^{t} B_k \times \Delta F_k(t') \right).$$

$\hat{Q}_k$ (t+1) indicates a predicted network status corresponding to the target sliced network at the moment t+1, $\hat{Q}_k$ (t) indicates a predicted network status corresponding to the target sliced network at the moment t, $\text{Cov}_k(Z)$ is described in substep 40611, $P_k$ is an asymptotic estimation error matrix, and $P_k$ meets the following matrix equation:

$$P_k \times (P_k + \text{Cov}_k(Z))^{-1} \times P_k = E_k \text{Cov}_k(V) E_k.$$

$\text{Cov}_k$ (V) in the matrix equation is described in substep 40611. $\Delta F_k(t)$ may be calculated by using the following formula:

$$\Delta F_k(t) = -(B_k^T \times P_{kk} \times B_k + \lambda I)^{-1} B_k^T \times P_{kk} \times \hat{Q}_k(t).$$

$\lambda$ is a network smoothing and congestion coordination parameter, $\lambda > 0$, and $P_{kk}$ meets the following matrix equation:

$$P_{kk} \times B_k (B_k^T \times P_{kk} \times B_k + \lambda I)^{-1} \times B_k^T \times P_{kk} = I.$$

A link bandwidth correction value that is corresponding to the target sliced network and that is obtained based on $\Delta F_k(t)$ is:

$$\left\{ \Delta f_{(u,v)}^n(t) = \sum_{m \in k(n)} \Delta f_{(u,v)}^m(t), \forall n, (u, v) \right\}.$$

t indicates the target moment, $\Delta f_{(u,v)}^n(t)$ indicates a link bandwidth correction value corresponding to any aggregation flow n in the target sliced network on any link (u,v) in the target sliced network at the target moment, $\Delta f_{(u,v)}^m(t)$ indicates a link bandwidth correction value corresponding to a data stream m in any aggregation flow n in the target sliced network on any link (u,v) in the target sliced network at the target moment, and k(n) indicates the set of data streams included in the aggregation flow n in the target sliced network.

Substep 4063: Perform, based on the link bandwidth correction value corresponding to each aggregation flow in the target sliced network on each link in the target sliced network at the target moment, closed-loop correction on the initial link bandwidth allocated to each aggregation flow in the target sliced network on each link in the target sliced network, to obtain corrected link bandwidth corresponding to the target sliced network at the target moment, where the corrected link bandwidth corresponding to the target sliced network at the target moment includes corrected link bandwidth allocated to each aggregation flow in the target sliced network on each link in the target sliced network at the target moment.

After obtaining the link bandwidth correction value corresponding to each aggregation flow in the target sliced network on each link in the target sliced network at the target moment, the target second controller may perform, based on the link bandwidth correction value corresponding to each aggregation flow in the target sliced network on each link in the target sliced network at the target moment, closed-loop correction on the initial link bandwidth (initial link bandwidth allocated at the target moment) allocated to each aggregation flow in the target sliced network on each link in the target sliced network, to obtain the corrected link bandwidth corresponding to the target sliced network at the target moment. The corrected link bandwidth corresponding to the target sliced network at the target moment includes the corrected link bandwidth allocated to each aggregation flow in the target sliced network on each link in the target sliced network at the target moment.

Optionally, the target second controller may use a sum of the link bandwidth correction value corresponding to each aggregation flow in the target sliced network on each link in the target sliced network at the target moment and the initial link bandwidth allocated to each aggregation flow in the target sliced network on each link in the target sliced network as the corrected link bandwidth allocated to each aggregation flow in the target sliced network on each link in the target sliced network at the target moment.

In this embodiment of this application, the corrected link bandwidth corresponding to the target sliced network at the target moment is:

$$\{ f_{(u,v)}^n(t) = f_{(u,v)}^{n*} + \Delta f_{(u,v)}^n(t), \forall n, (u, v) \}.$$

t indicates the target moment, u indicates the source node of the link (u,v), v indicates the destination node of the link (u,v), $\forall n$ indicates any aggregation flow n in the target sliced network, $f_{(u,v)}^{n*}$ indicates initial link bandwidth allocated to any aggregation flow n in the target sliced network on any link (u,v) in the target sliced network, $\Delta f_{(u,v)}^n(t)$ indicates a link bandwidth correction value corresponding to any aggregation flow n in the target sliced network on any link (u,v) in the target sliced network at the target moment, and $f_{(u,v)}^n(t)$ indicates corrected link bandwidth allocated to any aggregation flow n in the target sliced network on any link (u,v) in the target sliced network at the target moment.

Step 407: The target second controller delivers corresponding corrected link bandwidth to each switch in the target sliced network, where each switch is configured to transmit a corresponding aggregation flow based on the corresponding corrected link bandwidth.

After obtaining the corrected link bandwidth corresponding to the target sliced network, the target second controller may deliver the corresponding corrected link bandwidth to each switch in the target sliced network, so that each switch in the target sliced network transmits the corresponding aggregation flow based on the corresponding corrected link bandwidth.

Optionally, as shown in FIG. 3, the target second controller may be the second controller 1, and the target sliced network may be the sliced network 1; and the target sliced network includes the following switches: the switch 11, the switch 12, the switch 13, the switch 14, and the switch 15. Therefore, the second controller 1 delivers corrected link bandwidth corresponding to the switch 11 to the switch 11, delivers corrected link bandwidth corresponding to the switch 12 to the switch 12, delivers corrected link bandwidth corresponding to the switch 13 to the switch 13, and so on.

It should be noted that link bandwidth in this embodiment of this application may be alternatively a link transmission rate. In this embodiment of this application, for wording consistency, the link bandwidth is used as an example for description. However, replacing the link bandwidth with the link transmission rate also falls within the protection scope of this application. Details are not described herein.

The network control method provided in this embodiment of this application can well resolve a large-scale flow control optimization problem. When there are a relatively large quantity of data streams in the network, the first controller finds an optimal control point (for example, an aggregation flow routing policy and a sliced network) in the network at an aggregation flow level, and then the second controller performs closed-loop control at a data stream level in the sliced network to trace the optical control point in the network.

It should be noted that a sequence of the steps in the network control method provided in this embodiment of this application may be properly adjusted, and a step may be added or removed based on a situation. All modified methods that may be readily figured out by a person skilled in the art without departing from the technical scope disclosed in this application shall fall within the protection scope of this application. Therefore, details are not described.

In conclusion, according to the network control method provided in this embodiment of this application, the first controller slices the communications network to obtain a sliced network, and each sliced network is corresponding to one second controller. The target second controller performs, through closed-loop control based on the queue status of the target sliced network, closed-loop correction on the initial link bandwidth allocated to each aggregation flow in the target sliced network on each link in the target sliced network, so that each switch in the target sliced network transmits the corresponding aggregation flow based on the corrected link bandwidth. Therefore, the first controller and the second controller can cooperatively control the network, thereby reducing a delay and improving a network control effect.

According to the network control method provided in this embodiment of this application, the first controller obtains the global network information through network measurement, properly configures network resources based on the global network information, and maps the network resources to different sliced networks to ensure that data stream traffic requirements of different services are met, and to implement service isolation and resource reuse in the network.

In the network control method provided in this embodiment of this application, the first controller grasps the global network information, and optimizes the network at the aggregation flow level based on the global network information. The optimization can maximize network resource utilization. The first controller updates a policy only when a network topology changes and an aggregation flow traffic characteristic changes. The second controller senses a time-varying characteristic of a data stream in the sliced network through network measurement. When traffic suddenly increases or decreases, the second controller may sense a local network status to obtain the change in real time, and adjust the policy in real time based on the change to rapidly respond to a local change, so that the network returns to a global optimal control point.

According to the network control method provided in this embodiment of this application, a control layer is divided into two layers: a fast control layer and a slow control layer. A slow controller (the first controller) performs aggregation flow level scheduling on the network, and a fast controller (the second controller) performs data stream level scheduling on the network, to more efficiently respond to a service fluctuation. In addition, the slow controller can find the aggregation flow routing policy and the sliced network to maximize network resource utilization. The fast controller properly uses resources in the sliced network within the sliced network at the data stream level to reduce network congestion while maintaining high resource utilization. In this embodiment of this application, the fast controller and the slow controller cooperate to optimize network performance, so that the network can robustly adapt to a traffic flow change.

Figure 7:
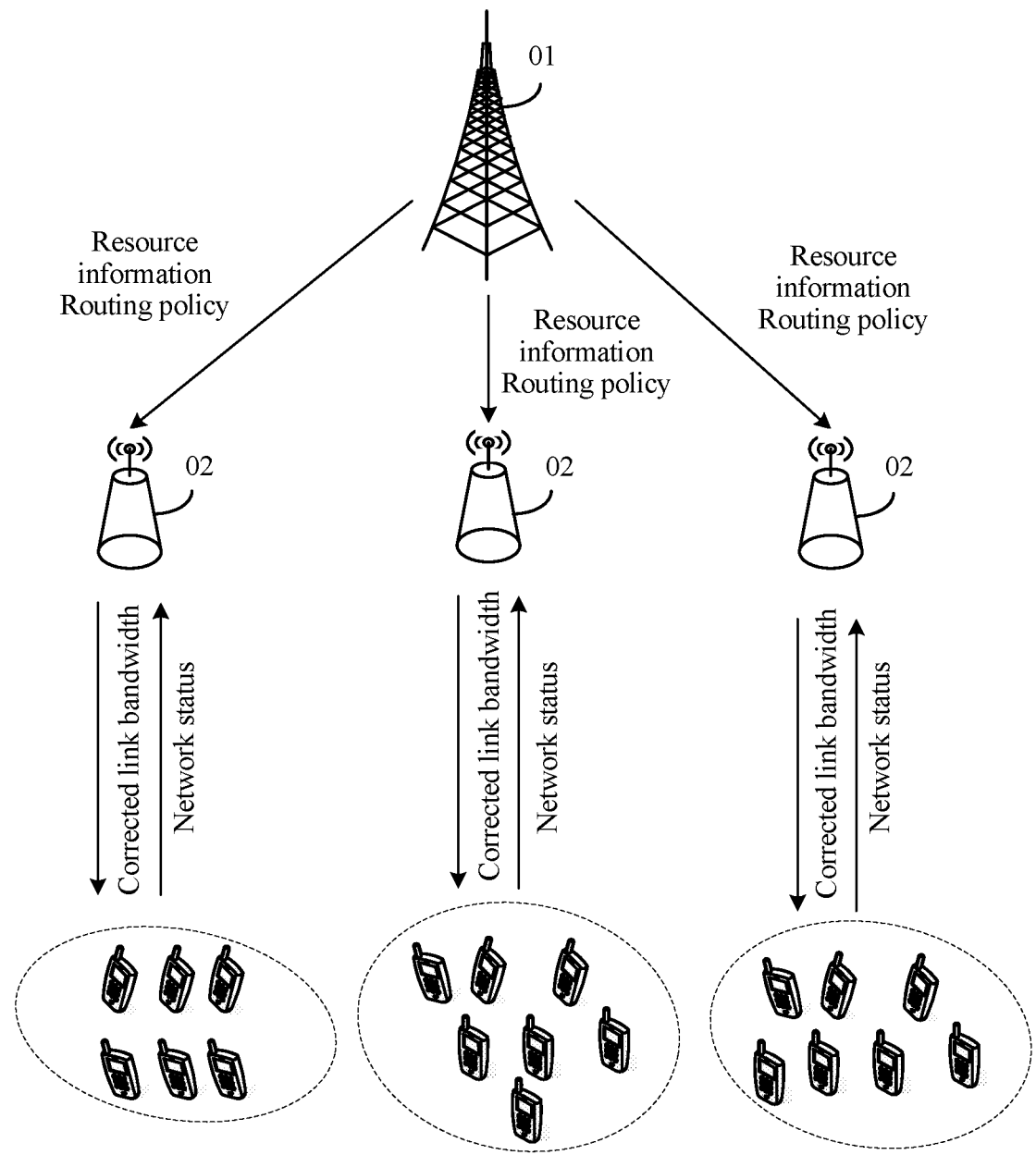
FIG. 7 is a schematic diagram of network control according to an embodiment of this application.

The network control method provided in this embodiment of this application may be applied to a device to device (English: Device to Device, D2D for short) network to implement large-scale flow control in the D2D network. Referring to FIG. 7, FIG. 7 shows a schematic diagram of a D2D network according to an embodiment of this application. Referring to FIG. 7, the D2D network includes a macro base station 01, at least one small cell 02, and at least one user terminal.

The macro base station 01 may obtain global network information. The global network information may include a network topology structure of the D2D network, channel statuses and channel capacities of the user terminal and the small cell 02, traffic matrix information of an aggregation flow, and the like. Then the macro base station 01 determines a routing policy of each aggregation flow and resource information of a sliced network by calculating a traffic engineering issue based on the global network information. Each sliced network includes at least one user terminal, and each sliced network is corresponding to one small cell 02. After determining the routing policy of each aggregation flow and the resource information of the sliced network, the macro base station 01 may send the routing policy of each aggregation flow and the resource information of the sliced network to a corresponding small cell 02.

After receiving the routing policy and the resource information of the sliced network that are corresponding to the small cell 02, the small cell 02 obtains a queue status of each user terminal in the corresponding sliced network, obtains a network status of the sliced network, calculates a link service rate correction value (or a link bandwidth correction value) of the sliced network through closed-loop control based on the network status of the sliced network, and corrects a link service rate of the sliced network based on the link service rate correction value. Then, the small cell 02 calculates a data transmit power of each user terminal in the sliced network based on the corrected link service rate and a current channel status of the sliced network, and delivers the data transmit power to a corresponding user terminal, so that the user terminal transmits data in real time based on the data transmit power.

The following describes an embodiment of an apparatus in this application. The apparatus can be configured to perform the method embodiment of this application. For details not disclosed in the embodiment of the apparatus in this application, refer to the method embodiment of this application.

Figure 8:
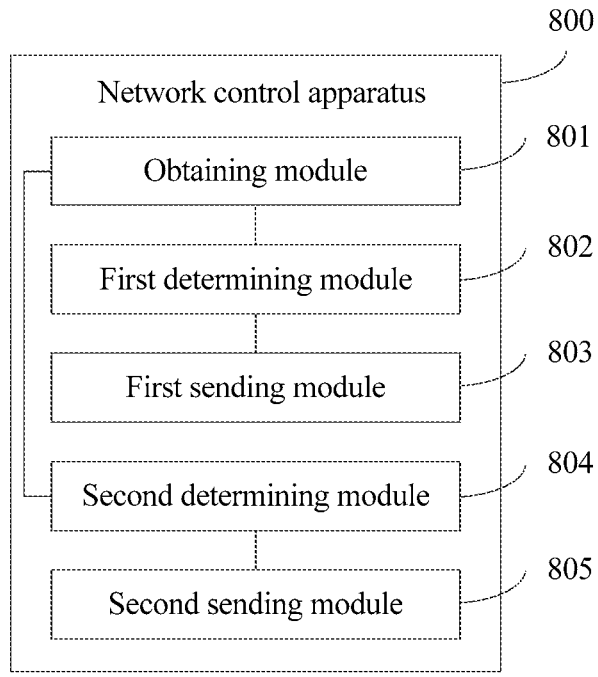
FIG. 8 is a block diagram of a network control apparatus according to an embodiment of this application.

Referring to FIG. 8, FIG. 8 shows a block diagram of a network control apparatus 800 according to an embodiment of this application. The network control apparatus 800 may be implemented as a part or all of the first controller in the implementation environment shown in FIG. 3 by using software, hardware, or a combination thereof. Referring to FIG. 8, the network control apparatus 800 may include:

an obtaining module 801, configured to obtain global network information, where the global network information includes a capacity of each link in a communications network and traffic matrix information of each aggregation flow in the communications network, and each aggregation flow in the communications network is obtained by classifying all traffic flows in the communications network;

a first determining module 802, configured to determine resource information of at least one sliced network based on the global network information, where the at least one sliced network is obtained by slicing the communications network, each sliced network in the at least one sliced network is corresponding to one second controller, and resource information of each sliced network includes initial link bandwidth allocated to each aggregation flow in each sliced network on each link in each sliced network; and a first sending module 803, configured to send resource information of a corresponding sliced network to each second controller.

In conclusion, according to the network control apparatus provided in this embodiment of this application, the first controller slices the communications network to obtain a sliced network, where each sliced network is corresponding to one second controller; and sends the resource information of the corresponding sliced network to each second controller, so that each second controller performs, through closed-loop control based on a queue status of the corresponding sliced network, closed-loop correction on initial link bandwidth allocated to each aggregation flow in the corresponding sliced network on each link in the corresponding sliced network, and each switch in the corresponding sliced network transmits a corresponding aggregation flow based on corrected link bandwidth. Therefore, the first controller and the second controller can cooperatively control the network, thereby reducing a delay and improving a network control effect.

Further, still referring to FIG. 8, the network control apparatus 800 further includes:

a second determining module 804, configured to determine, based on the global network information, a routing policy corresponding to the at least one sliced network, where a routing policy corresponding to each sliced network includes a routing policy corresponding to each aggregation flow in each sliced network; and a second sending module 805, configured to send a corresponding routing policy to each second controller.

Optionally, the global network information further includes a network topology structure of the communications network. The network topology structure is used to indicate a connection relationship between at least one switch.

Optionally, the capacity of each link in the communications network is $\{c_{(u,v)}, \forall(u,v)\}$, where u indicates a source node of a link (u,v), v indicates a destination node of the link (u,v), $c_{(u,v)}$ indicates a capacity of the link (u,v), $\forall(u,v)$ indicates any link (u,v) in the communications network. The traffic matrix information of each aggregation flow in the communications network is $\{V^n, \forall n\}$, $V^n$ where indicates a bandwidth requirement of an aggregation flow n, and $\forall n$ indicates any aggregation flow n in the communications network. The first determining module 802 is configured to:

determine the resource information of the at least one sliced network based on the capacity of each link in the communications network and the traffic matrix information of each aggregation flow in the communications network when a target function uses a minimum value.

The target function is $$y = \max_{(u,v)} \sum_n f_{(u,v)}^{n*} / c_{(u,v)},$$

and the target function meets a first constraint, a second constraint, a third constraint, a fourth constraint, and a fifth constraint.

The first constraint is $$\sum_w f_{(w,d)}^{n*} = V^n, \text{ and } \forall d$$

is a destination node of the aggregation flow n.

The second constraint is $$\sum_w f_{(s,w)}^{n*} = V^n, \text{ and } \forall s$$

is a source node of the aggregation flow n.

The third constraint is $$\sum_u f_{(u,v)}^{n*} = \sum_{u'} f_{(v,u')}^{n*}, \forall v, n.$$

The fourth constraint is $$\sum_n f_{(u,v)}^{n*} \leq c_{(u,v)}, \forall (u, v).$$

The fifth constraint is $f_{(u,v)}^{n*} \geq 0$, $\forall(u,v)$, n.

$f_{(u,v)}^{n*}$ indicates initial link bandwidth allocated to any aggregation flow n in the communications network on any link (u,v) in the communications network, $f_{(u,v)}^{n*}/c_{(u,v)}$ indicates initial usage of any aggregation flow n in the communications network on any link (u,v) in the communications network, $$\sum_n f_{(u,v)}^{n*} / c_{(u,v)}$$

indicates a sum of initial usage of all aggregation flows n in the communications network on any link (u,v) in the communications network, $$\max_{(u,v)} \sum_n \frac{f_{(u,v)}^{n*}}{c_{(u,v)}}$$

indicates a maximum value in sums of initial usage of all aggregation flows n in the communications network on each link (u,v) in the communications network, $$\sum_w f_{(w,d)}^{n*}$$

indicates a sum of initial link bandwidth occupied by any aggregation flow n in the communications network on all links (w,d) that use a node d as a destination node in the communications network, $$\sum_w f_{(s,w)}^{n^*}$$

indicates a sum of initial link bandwidth occupied by any aggregation flow n in the communications network on all links (s,w) that use a node s as a source node in the communications network, $$\sum_u f_{(u,v)}^{n^*}$$

indicates a sum of initial link bandwidth occupied by any aggregation flow n in the communications network on all upstream links of a node v in the communications network, $$\sum_{u'} f_{(v,u')}^{n^*}$$

indicates a sum of initial link bandwidth occupied by any aggregation flow n in the communications network on all downstream links of the node v in the communications network, and $$\sum_n f_{(u,v)}^{n^*}$$

indicates a sum of initial link bandwidth allocated to all aggregation flows n in the communications network on any link (u,v) in the communications network.

In conclusion, according to the network control apparatus provided in this embodiment of this application, the first controller slices the communications network to obtain a sliced network, where each sliced network is corresponding to one second controller; and sends the resource information of the corresponding sliced network to each second controller, so that each second controller performs, through closed-loop control based on a queue status of the corresponding sliced network, closed-loop correction on initial link bandwidth allocated to each aggregation flow in the corresponding sliced network on each link in the corresponding sliced network, and each switch in the corresponding sliced network transmits a corresponding aggregation flow based on corrected link bandwidth. Therefore, the first controller and the second controller can cooperatively control the network, thereby reducing a delay and improving a network control effect.

Figure 9:
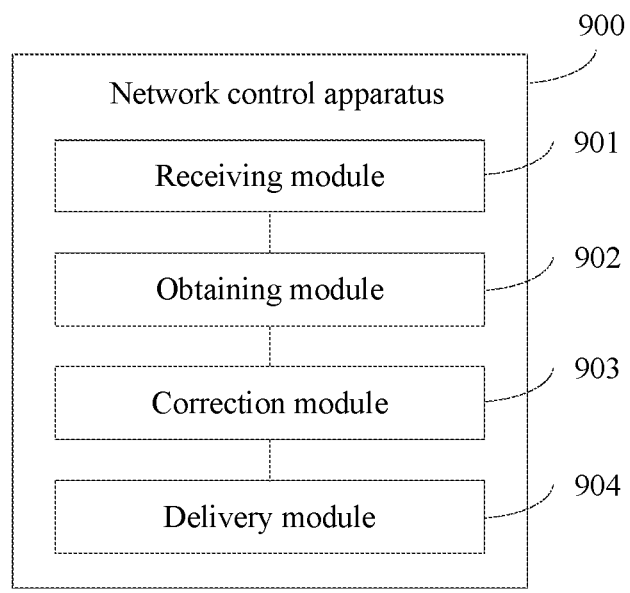
FIG. 9 is a block diagram of another network control apparatus according to an embodiment of this application.

Referring to FIG. 9, FIG. 9 shows a block diagram of another network control apparatus 900 according to an embodiment of this application. The network control apparatus 900 may be implemented as a part or all of a target second controller by using software, hardware, or a combination thereof. The target second controller may be any controller in the implementation environment shown in FIG. 3. Referring to FIG. 9, the network control apparatus 900 may include:

a receiving module 901, configured to receive resource information of a target sliced network sent by a first controller, where the resource information of the target sliced network includes initial link bandwidth allocated to each aggregation flow in the target sliced network on each link in each sliced network, and the target sliced network is corresponding to the target second controller;

an obtaining module 902, configured to obtain a queue status corresponding to the target sliced network, where the queue status corresponding to the target sliced network includes a queue status corresponding to each switch in the target sliced network, and each switch is corresponding to one queue;

a correction module 903, configured to perform, through closed-loop control based on the queue status corresponding to the target sliced network, closed-loop correction on initial link bandwidth allocated to each aggregation flow in the target sliced network on each link in the target sliced network, to obtain corrected link bandwidth corresponding to the target sliced network, where the corrected link bandwidth corresponding to the target sliced network includes corrected link bandwidth allocated to each aggregation flow in the target sliced network on each link in the target sliced network; and a delivery module 904, configured to deliver corresponding corrected link bandwidth to each switch in the target sliced network, where each switch is configured to transmit a corresponding aggregation flow based on the corresponding corrected link bandwidth.

In conclusion, according to the network control apparatus provided in this embodiment of this application, the first controller slices a communications network to obtain a sliced network, and each sliced network is corresponding to one second controller. The target second controller performs, through closed-loop control based on the queue status of the target sliced network, closed-loop correction on the initial link bandwidth allocated to each aggregation flow in the target sliced network on each link in the target sliced network, so that each switch in the target sliced network transmits the corresponding aggregation flow based on the corrected link bandwidth. Therefore, the first controller and the second controller can cooperatively control the network, thereby reducing a delay and improving a network control effect.

Figure 10:
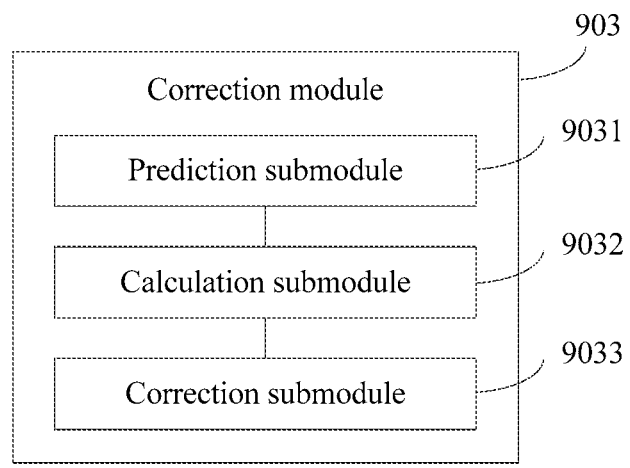
FIG. 10 is a block diagram of a correction module according to an embodiment of this application.

Optionally, the corrected link bandwidth corresponding to the target sliced network varies at different moments. Referring to FIG. 10, FIG. 10 shows a block diagram of a correction module 903 according to an embodiment of this application. Referring to FIG. 10, the correction module 903 includes:

a prediction submodule 9031, configured to predict a network status of the target sliced network based on the queue status corresponding to the target sliced network, to obtain a predicted network status;

a calculation submodule 9032, configured to calculate, based on the predicted network status, a link bandwidth correction value corresponding to each aggregation flow in the target sliced network on each link in the target sliced network at a target moment; and a correction submodule 9033, configured to perform, based on the link bandwidth correction value corresponding to each aggregation flow in the target sliced network on each link in the target sliced network at the target moment, closed-loop correction on the initial link bandwidth allocated to each aggregation flow in the target sliced network on each link in the target sliced network, to obtain corrected link bandwidth corresponding to the target sliced network at the target moment, where the corrected link bandwidth corresponding to the target sliced network at the target moment includes corrected link bandwidth allocated to each aggregation flow in the target sliced network on each link in the target sliced network at the target moment.

Optionally, the network status of the target sliced network varies at different moments, and the queue status corresponding to the target sliced network varies at different moments. A queue status corresponding to the target sliced network at the target moment includes: a real network status of the target sliced network at the target moment and observed noise of the target sliced network at the target moment.

The prediction submodule 9031 is configured to:

determine a first covariance matrix for the observed noise of the target sliced network at the target moment;

determine a second covariance matrix for an aggregation flow in the target sliced network at the target moment; and calculate the network status of the target sliced network based on the queue status corresponding to the target sliced network at the target moment, the first covariance matrix, and the second covariance matrix to obtain a predicted network status of the target sliced network at the target moment, where the predicted network status is associated with the real network status.

In conclusion, according to the network control apparatus provided in this embodiment of this application, the first controller slices a communications network to obtain a sliced network, and each sliced network is corresponding to one second controller. The target second controller performs, through closed-loop control based on the queue status of the target sliced network, closed-loop correction on the initial link bandwidth allocated to each aggregation flow in the target sliced network on each link in the target sliced network, so that each switch in the target sliced network transmits the corresponding aggregation flow based on the corrected link bandwidth. Therefore, the first controller and the second controller can cooperatively control the network, thereby reducing a delay and improving a network control effect.

It should be noted that when the network control apparatus provided in the embodiment controls the network, descriptions are provided only by using an example of division of the functional modules. In actual application, the functions may be allocated to different functional modules for implementation as required. That is, an internal structure of the device is divided into different functional modules to implement all or some functions described above. In addition, the network control apparatus provided in the embodiment pertains to a same concept as the network control method embodiment. For a specific implementation process, refer to the method embodiment. Details are not described herein again.

Figure 11:
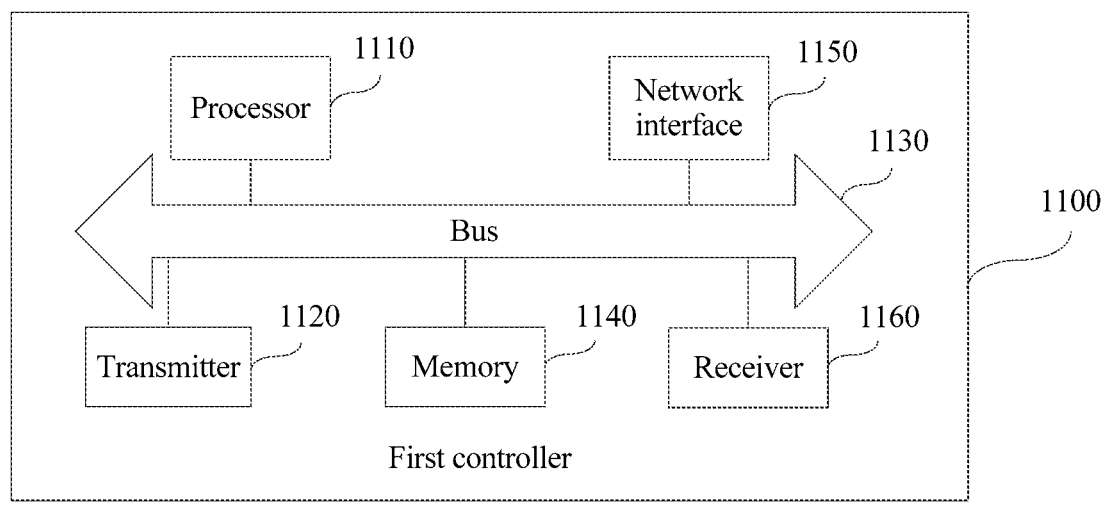
FIG. 11 is a block diagram of a first controller according to an embodiment of this application.

Referring to FIG. 11, FIG. 11 shows a schematic structural diagram of a first controller 1100 according to an embodiment of this application. The first controller 1100 may be the first controller in the implementation environment shown in FIG. 3, and is configured to perform a part of the method provided in the embodiment shown in FIG. 4A and FIG. 4B. Referring to FIG. 11, the first controller 1100 may include a processor 1110 and a transmitter 1120. The processor 1110 and the transmitter 1120 are connected by using a bus 1130.

The processor 1110 includes one or more processing cores. The processor 1110 executes various function applications and processes data by running a software program and a unit.

Optionally, as shown in FIG. 11, the first controller 1100 further includes a memory 1140, a network interface 1150, and a receiver 1160. The memory 1140, the network interface 1150, and the receiver 1160 are separately connected to the transmitter 1120 and the processor 1110 by using the bus 1130.

There may be a plurality of network interfaces 1150. The network interface 1150 is used for communication between the first controller 1100 and another storage device or network device. The network interface 1150 is optional. In actual application, the first controller 1100 may communicate with another storage device or network device by using the transmitter 1120 and the receiver 1160. Therefore, the first controller 1100 may not include the network interface. This is not limited in this embodiment of this application.

The processor 1110 is configured to obtain global network information, where the global network information includes a capacity of each link in a communications network and traffic matrix information of each aggregation flow in the communications network, and each aggregation flow in the communications network is obtained by classifying all traffic flows in the communications network.

The processor 1110 is configured to determine resource information of at least one sliced network based on the global network information, where the at least one sliced network is obtained by slicing the communications network, each sliced network in the at least one sliced network is corresponding to one second controller, and resource information of each sliced network includes initial link bandwidth allocated to each aggregation flow in each sliced network on each link in each sliced network.

The transmitter 1120 is configured to send resource information of a corresponding sliced network to each second controller.

Optionally, the processor 1110 is further configured to determine, based on the global network information, a routing policy corresponding to the at least one sliced network, where a routing policy corresponding to each sliced network includes a routing policy corresponding to each aggregation flow in each sliced network.

The transmitter 1120 is further configured to send a corresponding routing policy to each second controller.

Optionally, the global network information further includes a network topology structure of the communications network. The network topology structure is used to indicate a connection relationship between at least one switch.

Optionally, the capacity of each link in the communications network is $\{c_{(u,v)}, \forall(u,v)\}$, where u indicates a source node of a link (u,v), v indicates a destination node of the link (u,v), $c_{(u,v)}$ indicates a capacity of the link (u,v), $\forall(u,v)$ indicates any link (u,v) in the communications network. The traffic matrix information of each aggregation flow in the communications network is $\{V^n, \forall n\}$, where $V^n$ indicates a bandwidth requirement of an aggregation flow n, and $\forall n$ indicates any aggregation flow n in the communications network.

The processor 1110 is specifically configured to determine the resource information of the at least one sliced network based on the capacity of each link in the communications network and the traffic matrix information of each aggregation flow in the communications network when a target function uses a minimum value.

The target function is $$y = \max_{(u,v)} \sum_n \frac{f_{(u,v)}^{n^*}}{c_{(u,v)}},$$

and the target function meets a first constraint, a second constraint, a third constraint, a fourth constraint, and a fifth constraint.

The first constraint is $$\sum_w f_{(w,d)}^{n^*} = V^n, \text{ and } \forall d$$

is a destination node of the aggregation flow n.

The second constraint is $$\sum_w f_{(s,w)}^{n^*} = V^n, \text{ and } \forall s$$

is a source node of the aggregation flow n.

The third constraint is $$\sum_u f_{(u,v)}^{n^*} = \sum_{u'} f_{(v,u')}^{n^*}, \forall v,$$

n.

The fourth constraint is $$\sum_n f_{(u,v)}^{n^*} \le c_{(u,v)}, \forall (u, v).$$

The fifth constraint is $f_{(u,v)}^{n^*}$, $\forall (u,v)$, n.

$f_{(u,v)}^{n^*}$ indicates initial link bandwidth allocated to any aggregation flow n in the communications network on any link (u,v) in the communications network, $f_{(u,v)}^{n^*}/c_{(u,v)}$ indicates initial usage of any aggregation flow n in the communications network on any link (u,v) in the communications network, $$\sum_n \frac{f_{(u,v)}^{n^*}}{c_{(u,v)}}$$

indicates a sum of initial usage of all aggregation flows n in the communications network on any link (u,v) in the communications network, $$\max_{(u,v)} \sum_n \frac{f_{(u,v)}^{n^*}}{c_{(u,v)}}$$

indicates a maximum value in sums of initial usage of all aggregation flows n in the communications network on each link (u,v) in the communications network, $$\sum_w f_{(w,d)}^{n^*}$$

indicates a sum of initial link bandwidth occupied by any aggregation flow n in the communications network on all links (w,d) that use a node d as a destination node in the communications network, $$\sum_w f_{(s,w)}^{n^*}$$

indicates a sum of initial link bandwidth occupied by any aggregation flow n in the communications network on all links (s,w) that use a node s as a source node in the communications network, $$\sum_u f_{(u,v)}^{n^*}$$

indicates a sum of initial link bandwidth occupied by any aggregation flow n in the communications network on all upstream links of a node v in the communications network, $$\sum_{u'} f_{(v,u')}^{n^*}$$

indicates a sum of initial link bandwidth occupied by any aggregation flow n in the communications network on all downstream links of the node v in the communications network, and $$\sum_n f_{(u,v)}^{n^*}$$

indicates a sum of initial link bandwidth allocated to all aggregation flows n in the communications network on any link (u,v) in the communications network.

In conclusion, according to the first controller provided in this embodiment of this application, the first controller slices the communications network to obtain a sliced network, where each sliced network is corresponding to one second controller; and sends the resource information of the corresponding sliced network to each second controller, so that each second controller performs, through closed-loop control based on a queue status of the corresponding sliced network, closed-loop correction on initial link bandwidth allocated to each aggregation flow in the corresponding sliced network on each link in the corresponding sliced network, and each switch in the corresponding sliced network transmits a corresponding aggregation flow based on corrected link bandwidth. Therefore, the first controller and the second controller can cooperatively control the network, thereby reducing a delay and improving a network control effect.

Figure 12:
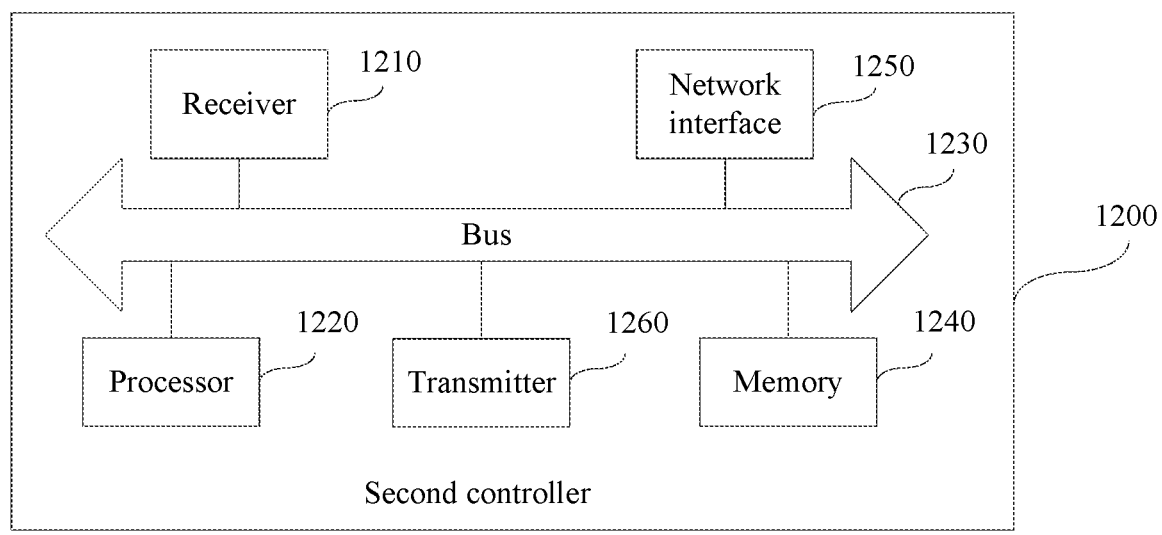
FIG. 12 is a block diagram of a second controller according to an embodiment of this application.

Referring to FIG. 12, FIG. 12 shows a schematic structural diagram of a second controller 1200 according to an embodiment of this application. The second controller 1200 may be any second controller in the implementation environment shown in FIG. 3, and is configured to perform a part of the method provided in the embodiment shown in FIG. 4A and FIG. 4B. Referring to FIG. 12, the second controller 1200 may include a receiver 1210 and a processor 1220. The receiver 1210 and the processor 1220 are connected by using a bus 1230.

The processor 1220 includes one or more processing cores. The processor 1220 executes various function applications and processes data by running a software program and a unit.

Optionally, as shown in FIG. 12, the second controller 1200 further includes a memory 1240, a network interface 1250, and a transmitter 1260. The memory 1240, the network interface 1250, and the transmitter 1260 are separately connected to the receiver 1210 and the processor 1220 by using the bus 1230.

There may be a plurality of network interfaces 1250. The network interface 1250 is used for communication between the second controller 1200 and another storage device or network device. The network interface 1250 is optional. In actual application, the second controller 1200 may communicate with another storage device or network device by using the receiver 1210 and the transmitter 1260. Therefore, the second controller 1200 may not include the network interface. This is not limited in this embodiment of this application.

The receiver 1210 is configured to receive resource information of a target sliced network sent by a first controller, where the resource information of the target sliced network includes initial link bandwidth allocated to each aggregation flow in the target sliced network on each link in each sliced network, and the target sliced network is corresponding to a target second controller.

The processor 1220 is configured to obtain a queue status corresponding to the target sliced network, where the queue status corresponding to the target sliced network includes a queue status corresponding to each switch in the target sliced network, and each switch is corresponding to one queue.

The processor 1220 is configured to perform, through closed-loop control based on the queue status corresponding to the target sliced network, closed-loop correction on initial link bandwidth allocated to each aggregation flow in the target sliced network on each link in the target sliced network, to obtain corrected link bandwidth corresponding to the target sliced network, where the corrected link bandwidth corresponding to the target sliced network includes corrected link bandwidth allocated to each aggregation flow in the target sliced network on each link in the target sliced network.

The transmitter 1260 is configured to deliver corresponding corrected link bandwidth to each switch in the target sliced network, where each switch is configured to transmit a corresponding aggregation flow based on the corresponding corrected link bandwidth.

Optionally, the corrected link bandwidth corresponding to the target sliced network varies at different moments. The processor 1220 is specifically configured to:

predict a network status of the target sliced network based on the queue status corresponding to the target sliced network, to obtain a predicted network status;

calculate, based on the predicted network status, a link bandwidth correction value corresponding to each aggregation flow in the target sliced network on each link in the target sliced network at a target moment; and perform, based on the link bandwidth correction value corresponding to each aggregation flow in the target sliced network on each link in the target sliced network at the target moment, closed-loop correction on the initial link bandwidth allocated to each aggregation flow in the target sliced network on each link in the target sliced network, to obtain corrected link bandwidth corresponding to the target sliced network at the target moment, where the corrected link bandwidth corresponding to the target sliced network at the target moment includes corrected link bandwidth allocated to each aggregation flow in the target sliced network on each link in the target sliced network at the target moment.

Optionally, the network status of the target sliced network varies at different moments, and the queue status corresponding to the target sliced network varies at different moments. A queue status corresponding to the target sliced network at the target moment includes: a real network status of the target sliced network at the target moment and observed noise of the target sliced network at the target moment.

The processor 1220 is specifically configured to:

determine a first covariance matrix for the observed noise of the target sliced network at the target moment;

determine a second covariance matrix for an aggregation flow in the target sliced network at the target moment; and calculate the network status of the target sliced network based on the queue status corresponding to the target sliced network at the target moment, the first covariance matrix, and the second covariance matrix to obtain a predicted network status of the target sliced network at the target moment, where the predicted network status is associated with the real network status.

In conclusion, according to the second controller provided in this embodiment of this application, the first controller slices a communications network to obtain a sliced network, and each sliced network is corresponding to one second controller. The target second controller performs, through closed-loop control based on the queue status of the target sliced network, closed-loop correction on the initial link bandwidth allocated to each aggregation flow in the target sliced network on each link in the target sliced network, so that each switch in the target sliced network transmits the corresponding aggregation flow based on the corrected link bandwidth. Therefore, the first controller and the second controller can cooperatively control the network, thereby reducing a delay and improving a network control effect.

Optionally, in the embodiment shown in FIG. 9 or FIG. 12, the corrected link bandwidth corresponding to the target sliced network at the target moment is $$\{f_{(u,v)}^n(t) = f_{(u,v)}^{n*} + \Delta f_{(u,v)}^n(t), \forall n, (u,v)\}.$$

t indicates the target moment, u indicates a source node of a link (u,v), v indicates a destination node of the link (u,v), $\forall n$ indicates any aggregation flow n in the target sliced network, $f_{(u,v)}^{n*}$ indicates initial link bandwidth allocated to any aggregation flow n in the target sliced network on any link (u,v) in the target sliced network, $\Delta f_{(u,v)}^n(t)$ indicates a link bandwidth correction value corresponding to any aggregation flow n in the target sliced network on any link (u,v) in the target sliced network at the target moment, and $f_{(u,v)}^n(t)$ indicates corrected link bandwidth allocated to any aggregation flow n in the target sliced network on any link (u,v) in the target sliced network at the target moment.

Optionally, in the embodiment shown in FIG. 9 or FIG. 12, the queue status corresponding to the target sliced network at the target moment is $Y_k(t) = Q_k(t - \tau_k) + Z(t)$.

t indicates the target moment, $Q_k(t) = \{Q_i^n(t)\}$, $Z(t) = \{Z_i^n(t)\}$, k indicates a number of the target sliced network, $Y_k(t)$ indicates the queue status corresponding to the target sliced network at the target moment, $Y_k(t)$ is obtained through observation, $Q_k(t)$ indicates the real network status of the target sliced network at the moment t, $Q_i^n(t)$ indicates a queue status of an aggregation flow n corresponding to a switch i in the target sliced network at the target moment, Z(t) indicates the observed noise of the target sliced network at the moment t, $Z_i^n(t)$ indicates observed noise of the queue status of the aggregation flow n corresponding to the switch i in the target sliced network at the target moment, and $\tau_k$ indicates an observed delay of obtaining the queue status corresponding to the target sliced network by the target second controller.

An embodiment of this application further provides a network control system. The network control system includes a first controller and at least one second controller. The at least one second controller includes a target second controller.

In a possible implementation, the first controller includes the network control apparatus 800 shown in FIG. 8, and the target second controller includes the network control apparatus 900 shown in FIG. 9.

In another possible implementation, the first controller is the first controller 1100 shown in FIG. 11, and the target second controller is the second controller 1200 shown in FIG. 12.

In conclusion, according to the network control system provided in this embodiment of this application, the first controller slices a communications network to obtain a sliced network, and each sliced network is corresponding to one second controller. The target second controller performs, through closed-loop control based on the queue status of the target sliced network, closed-loop correction on the initial link bandwidth allocated to each aggregation flow in the target sliced network on each link in the target sliced network, so that each switch in the target sliced network transmits the corresponding aggregation flow based on the corrected link bandwidth. Therefore, the first controller and the second controller can cooperatively control the network, thereby reducing a delay and improving a network control effect.

An embodiment of this application further provides a computer readable storage medium. The computer readable storage medium stores an instruction. When the instruction runs on a processing component of a computer, the processing component performs step 401 and step 402 provided in the embodiment shown in FIG. 4A and FIG. 4B.

An embodiment of this application further provides a computer readable storage medium. The computer readable storage medium stores an instruction. When the instruction runs on a processing component of a computer, the processing component performs step 403 to step 407 provided in the embodiment shown in FIG. 4A and FIG. 4B.

An embodiment of this application further provides a computer program product including an instruction. When the computer program product runs on a computer, the computer performs step 401 and step 402 provided in the embodiment shown in FIG. 4A and FIG. 4B.

An embodiment of this application further provides a computer program product including an instruction. When the computer program product runs on a computer, the computer performs step 403 to step 407 provided in the embodiment shown in FIG. 4A and FIG. 4B.

An embodiment of this application further provides a processing apparatus. The processing apparatus includes at least one circuit. The at least one circuit is configured to perform step 401 and step 402 provided in the embodiment shown in FIG. 4A and FIG. 4B.

An embodiment of this application further provides a processing apparatus. The processing apparatus includes at least one circuit. The at least one circuit is configured to perform step 403 to step 407 provided in the embodiment shown in FIG. 4A and FIG. 4B.

A person of ordinary skill in the art may understand that all or some of the steps of the embodiments may be implemented by hardware or a program instructing related hardware. The program may be stored in a computer readable storage medium. The storage medium may include a read-only memory, a magnetic disk, an optical disc, or the like.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. A network control method, wherein the method is applied to a first controller in a communications network, the communications network comprises the first controller, at least one second controller, and at least one switch, and the method comprises:

obtaining global network information, wherein the global network information comprises a capacity of each link in the communications network and traffic matrix information of each aggregation flow in the communications network, and each aggregation flow in the communications network is obtained by classifying all traffic flows in the communications network;

determining resource information of at least one sliced network based on the global network information, wherein the at least one sliced network is obtained by slicing the communications network, each sliced network in the at least one sliced network is corresponding to one second controller, and resource information of each sliced network comprises initial link bandwidth allocated to each aggregation flow in each sliced network on each link in each sliced network; and sending resource information of a corresponding sliced network to each second controller.

2. The method according to claim 1, wherein the method further comprises:

determining, based on the global network information, a routing policy corresponding to the at least one sliced network, wherein a routing policy corresponding to each sliced network comprises a routing policy corresponding to each aggregation flow in each sliced network; and sending a corresponding routing policy to each second controller.

3. The method according to claim 1, wherein the global network information further comprises a network topology structure of the communications network, and the network topology structure is used to indicate a connection relationship between the at least one switch.

4. The method according to claim 3, wherein:

the capacity of each link in the communications network is $\{c_{(u,v)}, \forall(u,v)\}$, u indicates a source node of a link (u,v), v indicates a destination node of the link (u,v), $c_{(u,v)}$ indicates a capacity of the link (u,v), and $\forall(u,v)$ indicates any link (u,v) in the communications network;

the traffic matrix information of each aggregation flow in the communications network is $\{V^n, \forall n\}$, $V^n$ indicates a bandwidth requirement of an aggregation flow n, and $\forall n$ indicates any aggregation flow n in the communications network;

the determining resource information of at least one sliced network based on the global network information comprises:

determining the resource information of the at least one sliced network based on the capacity of each link in the communications network and the traffic matrix information of each aggregation flow in the communications network when a target function uses a minimum value; the target function is $$y = \max_{(u,v)} \sum_n \frac{f_{(u,v)}^{n*}}{c_{(u,v)}},$$

and the target function meets a first constraint, a second constraint, a third constraint, a fourth constraint, and a fifth constraint;
the first constraint is $$\sum_w f_{(w,d)}^{n*} = V^n, \text{ and } \forall\, d$$

is a destination node of the aggregation flow n;
the second constraint is $$\sum_w f_{(s,w)}^{n*} = V^n, \text{ and } \forall\, s$$

is a source node of the aggregation flow n;
the third constraint is $$\sum_u f_{(u,v)}^{n*} = \sum_{u'} f_{(v,u')}^{n*}, \forall\, v,$$

n;
the fourth constraint is $$\sum_n f_{(u,v)}^{n*} \le c_{(u,v)}, \forall\, (u, v);$$

and
the fifth constraint is $f_{(u,v)}^{n*} \ge 0$, $\forall(u,v)$, n; wherein
$f_{(u,v)}^{n*}$ indicates initial link bandwidth allocated to any aggregation flow n in the communications network on any link (u,v) in the communications network,
$f_{(u,v)}^{n*}/c_{(u,v)}$ indicates initial usage of any aggregation flow n in the communications network on any link (u,v) in the communications network, $$\sum_n \frac{f_{(u,v)}^{n*}}{c_{(u,v)}}$$

indicates a sum of initial usage of all aggregation flows n in the communications network on any link (u,v) in the communications network, $$\max_{(u,v)} \sum_n \frac{f_{(u,v)}^{n*}}{c_{(u,v)}}$$

indicates a maximum value in sums of initial usage of all aggregation flows n in the communications network on each link (u,v) in the communications network, $$\sum_w f_{(w,d)}^{n*}$$

indicates a sum of initial link bandwidth occupied by any aggregation flow n in the communications network on all links (w,d) that use a node d as a destination node in the communications network, $$\sum_w f_{(s,w)}^{n*}$$

indicates a sum of initial link bandwidth occupied by any aggregation flow n in the communications network on all links (s,w) that use a node s as a source node in the communications network, $$\sum_u f_{(u,v)}^{n*}$$

indicates a sum of initial link bandwidth occupied by any aggregation flow n in the communications network on all upstream links of a node v in the communications network, $$\sum_{u'} f_{(v,u')}^{n*}$$

indicates a sum of initial link bandwidth occupied by any aggregation flow n in the communications network on all downstream links of the node v in the communications network, and $$\sum_n f_{(u,v)}^{n*}$$

indicates a sum of initial link bandwidth allocated to all aggregation flows n in the communications network on any link (u,v) in the communications network.

5. A first controller, wherein the first controller comprises a processor and a memory, the processor is configured to execute an instruction stored in the memory, and the processor implements the network control method according to claim 1 by executing the instruction.

6. A network control method, wherein the method is applied to a target second controller in a communications network, the communications network comprises a first controller, at least one second controller, and at least one switch, the at least one second controller comprises the target second controller, and the method comprises:
receiving resource information of a target sliced network sent by the first controller, wherein the resource information of the target sliced network comprises initial link bandwidth allocated to each aggregation flow in the target sliced network on each link in each sliced network, and the target sliced network is corresponding to the target second controller;
obtaining a queue status corresponding to the target sliced network, wherein the queue status corresponding to the target sliced network comprises a queue status corresponding to each switch in the target sliced network, and each switch is corresponding to one queue;

performing, through closed-loop control based on the queue status corresponding to the target sliced network, closed-loop correction on initial link bandwidth allocated to each aggregation flow in the target sliced network on each link in the target sliced network, to obtain corrected link bandwidth corresponding to the target sliced network, wherein the corrected link bandwidth corresponding to the target sliced network comprises corrected link bandwidth allocated to each aggregation flow in the target sliced network on each link in the target sliced network; and delivering corresponding corrected link bandwidth to each switch in the target sliced network, wherein each switch is configured to transmit a corresponding aggregation flow based on the corresponding corrected link bandwidth.

7. The method according to claim 6, wherein the corrected link bandwidth corresponding to the target sliced network varies at different moments; and the performing, through closed-loop control based on the queue status corresponding to the target sliced network, closed-loop correction on initial link bandwidth allocated to each aggregation flow in the target sliced network on each link in the target sliced network, to obtain corrected link bandwidth corresponding to the target sliced network comprises:

predicting a network status of the target sliced network based on the queue status corresponding to the target sliced network, to obtain a predicted network status;

calculating, based on the predicted network status, a link bandwidth correction value corresponding to each aggregation flow in the target sliced network on each link in the target sliced network at a target moment; and performing, based on the link bandwidth correction value corresponding to each aggregation flow in the target sliced network on each link in the target sliced network at the target moment, closed-loop correction on the initial link bandwidth allocated to each aggregation flow in the target sliced network on each link in the target sliced network, to obtain corrected link bandwidth corresponding to the target sliced network at the target moment, wherein the corrected link bandwidth corresponding to the target sliced network at the target moment comprises corrected link bandwidth allocated to each aggregation flow in the target sliced network on each link in the target sliced network at the target moment.

8. The method according to claim 7, wherein the network status of the target sliced network varies at different moments, and the queue status corresponding to the target sliced network varies at different moments;

a queue status corresponding to the target sliced network at the target moment comprises: a real network status of the target sliced network at the target moment and observed noise of the target sliced network at the target moment; and the predicting a network status of the target sliced network based on the queue status corresponding to the target sliced network, to obtain a predicted network status comprises:

determining a first covariance matrix for the observed noise of the target sliced network at the target moment;

determining a second covariance matrix for an aggregation flow in the target sliced network at the target moment; and calculating the network status of the target sliced network based on the queue status corresponding to the target sliced network at the target moment, the first covariance matrix, and the second covariance matrix to obtain a predicted network status of the target sliced network at the target moment, wherein the predicted network status is associated with the real network status.

9. The method according to claim 8, wherein:

the queue status corresponding to the target sliced network at the target moment is:

$Y_k(t) = Q_k(t - \tau k) + Z(t);$ and t indicates the target moment, $Q_k(t) = \{Q_i^n(t)\}$, $Z(t) = \{Z_i^n(t)\}$, k indicates a number of the target sliced network, $Y_k(t)$ indicates the queue status corresponding to the target sliced network at the target moment, $Y_k(t)$ is obtained through observation, $Q_k(t)$ indicates the real network status of the target sliced network at the target moment, $Q_i^n(t)$ indicates a queue status of an aggregation flow n corresponding to a switch i in the target sliced network at the target moment, $Z(t)$ indicates the observed noise of the target sliced network at the target moment, $Z_i^n(t)$ indicates observed noise of the queue status of the aggregation flow n corresponding to the switch i in the target sliced network at the target moment, and $\tau_k$ indicates an observed delay of obtaining the queue status corresponding to the target sliced network by the target second controller.

10. The method according to claim 7, wherein:

the corrected link bandwidth corresponding to the target sliced network at the target moment is:

$\{f_{(u,v)}^n(t) = f_{(u,v)}^{n*} + \Delta f_{(u,v)}^n(t), \forall n, (u,v)\};$ t indicates the target moment, u indicates a source node of a link (u,v), v indicates a destination node of the link (u,v), ∀n indicates any aggregation flow n in the target sliced network, $f_{(u,v)}^{n*}$ indicates initial link bandwidth allocated to any aggregation flow n in the target sliced network on any link (u,v) in the target sliced network, $\Delta f_{(u,v)}^n(t)$ indicates a link bandwidth correction value corresponding to any aggregation flow n in the target sliced network on any link (u,v) in the target sliced network at the target moment, and $f_{(u,v)}^n(t)$ indicates corrected link bandwidth allocated to any aggregation flow n in the target sliced network on any link (u,v) in the target sliced network at the target moment.

* * * * *